United States Patent
Zembutsu et al.

(10) Patent No.: US 9,706,530 B2
(45) Date of Patent: *Jul. 11, 2017

(54) COMMUNICATION SYSTEM, METHOD, AND APPARATUS

(71) Applicant: NEC Corporation, Tokyo (JP)

(72) Inventors: Hajime Zembutsu, Tokyo (JP); Toshiyuki Tamura, Tokyo (JP); Takanori Iwai, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/934,521

(22) Filed: Nov. 6, 2015

(65) Prior Publication Data

US 2016/0066231 A1 Mar. 3, 2016

Related U.S. Application Data

(62) Division of application No. 14/233,649, filed as application No. PCT/JP2012/075219 on Sep. 28, 2012, now Pat. No. 9,572,134.

(30) Foreign Application Priority Data

Sep. 30, 2011 (JP) ................................ 2011-217384

(51) Int. Cl.
*H04W 36/12* (2009.01)
*H04W 72/04* (2009.01)
(Continued)

(52) U.S. Cl.
CPC ....... *H04W 72/0406* (2013.01); *H04L 5/0092* (2013.01); *H04M 3/42* (2013.01);
(Continued)

(58) Field of Classification Search
CPC ....... H04L 5/0092; H04M 3/42; H04W 24/02; H04W 36/12; H04W 48/18;
(Continued)

(56) References Cited

U.S. PATENT DOCUMENTS 8,072,900 B2 12/2011 Antal et al.
8,565,100 B2 * 10/2013 Jokimies ............... H04W 4/006
370/242
(Continued)

FOREIGN PATENT DOCUMENTS

JP 2003-338832 11/2003
JP 2010-534961 11/2010
(Continued)

OTHER PUBLICATIONS

3GPP TS 23.272 v8.1.0, 2008-09: Technical Specification Group Services and System Aspects; Circuit Switched Fallback in Evolved Packet System; Stage 2 (Release 8).*
(Continued)

*Primary Examiner* — Mohamed Kamara
(74) *Attorney, Agent, or Firm* — Finnegan, Henderson, Farabow, Garrett & Dunner, L.L.P.

(57) ABSTRACT

A core network includes a plurality of nodes that serve as nodes managing mobility of a terminal and that are different with regards to service functions that nodes provide to the terminal. Based on subscriber information and terminal information, a node to be connected to the terminal is selected on the core network side, depending on a service characteristic utilized by the terminal or on a type of the terminal and the terminal is connected to the selected node.

30 Claims, 16 Drawing Sheets

(51) Int. Cl.

| | |
|---|---|
| *H04M 3/42* | (2006.01) |
| *H04W 24/02* | (2009.01) |
| *H04L 5/00* | (2006.01) |
| *H04W 8/20* | (2009.01) |
| *H04W 48/18* | (2009.01) |
| *H04W 76/02* | (2009.01) |
| *H04W 8/06* | (2009.01) |
| *H04W 76/04* | (2009.01) |

(52) U.S. Cl.
CPC .............. *H04W 8/20* (2013.01); *H04W 24/02* (2013.01); *H04W 36/12* (2013.01); *H04W 48/18* (2013.01); *H04W 8/06* (2013.01); *H04W 76/02* (2013.01); *H04W 76/041* (2013.01)

(58) Field of Classification Search
CPC .............. H04W 72/0406; H04W 76/02; H04W 76/041; H04W 8/06; H04W 8/20; H04W 76/021; H04W 88/02; H04W 8/065; H04W 4/005; H04W 88/08
USPC ....... 370/311, 252, 254, 328–329, 338, 356; 455/436–437, 435.1, 445
See application file for complete search history.

(56) References Cited

U.S. PATENT DOCUMENTS

| | | | |
|---|---|---|---|
| 8,838,806 B2 | 9/2014 | Lu et al. | |
| 8,885,543 B2 | 11/2014 | Takahashi et al. | |
| 8,995,262 B2 | 3/2015 | Chowdhury et al. | |
| 9,077,723 B2 | 7/2015 | Li et al. | |
| 9,088,967 B2* | 7/2015 | Lim | H04W 76/021 |
| 2007/0032251 A1* | 2/2007 | Shaheen | H04L 12/5895 |
| | | | 455/466 |
| 2007/0195710 A1* | 8/2007 | Nakata | H04L 12/5695 |
| | | | 370/254 |
| 2007/0254667 A1 | 11/2007 | Jokinen | |
| 2009/0067628 A1 | 3/2009 | Pudney et al. | |
| 2009/0170426 A1 | 7/2009 | Jung et al. | |
| 2009/0176496 A1* | 7/2009 | Li | H04L 12/5695 |
| | | | 455/437 |
| 2010/0120399 A1 | 5/2010 | Guo et al. | |
| 2011/0075675 A1 | 3/2011 | Koodli et al. | |
| 2011/0292893 A1 | 12/2011 | Lee et al. | |
| 2012/0028640 A1 | 2/2012 | Guo et al. | |
| 2012/0238208 A1* | 9/2012 | Bienas | H04W 8/24 |
| | | | 455/41.2 |
| 2012/0252481 A1 | 10/2012 | Anpat et al. | |
| 2012/0254890 A1 | 10/2012 | Li et al. | |
| 2013/0021970 A1 | 1/2013 | Lei | |

FOREIGN PATENT DOCUMENTS

| | | |
|---|---|---|
| WO | WO 2007/058024 | 5/2007 |
| WO | WO 2011/082538 | 7/2011 |
| WO | WO 2011/094933 A1 | 8/2011 |
| WO | WO 2011/119680 A2 | 9/2011 |

OTHER PUBLICATIONS

"3GPP TS 23.401 V10.5.0", $3^{rd}$ Generation Partnership Project; Technical Specification Group Services and System Aspects; General Packet Radio Service (GPRS) enhancements for Evolved Universal Terrestrial Radio Access Network, (E-Utran) access (Release 10), pp. 80-91, Sep. 2011.
Ericsson, MME Selection Principles, S2-071739, Apr. 23, 2007.
Japanese Office Action issued on Dec. 17, 2013 in Japanese Patent Application No. 2013-536460.
International Search Report and Written Opinion mailed Nov. 20, 2012.
Motorola, "Reactive Load Management for MTC Devices", 3GPP TSG SA WG2 Meeting #79E, TD S2-103176, $3^{rd}$ Generation Partnership Project (3GPP), Mobile Competence Centre, 650, Route Des Lucioles.
F-06921 Sophia-Antipolis Cedex, pp. 3-4, Jul. 2010.
"$3^{rd}$ Generation Partnership Project; Technical Specification Group Services and System Aspects; System Improvements for Machine-Type Communications; (Release 11)", 3GPP Standard; 3GPP TR 23.888, v1.4.0, $3^{rd}$ Generation Partnership Project (3GPP), Mobile Competence Centre, 650, Route Des Lucioles, F-06921 Sophia-Antipolis Cedex, pp. 1-139, Aug. 2011.
Extended European Search Report mailed on Apr. 10, 2015 by the European Patent Office in counterpart European Patent Application No. 12836942.8.
Vodafone, Ipwireless, "Efficient small data transmission", SA WG2 Meeting #86, S2-113826, rev of S2-113677, pp. 1-4, Jul. 2011.
Extended European Search Report mailed on Feb. 3, 2016, by the European Patent Office in counterpart European Patent Application No. 15193540.0.
Ericsson, "Load re-balancing solution", 3GPP TSG SA WG2 Meeting #64, S2-083156, Apr. 2008.
Extended European Search Report mailed on Apr. 29, 2016, by the European Patent Office in counterpart European Patent Application No. 16150657.1.
Alcatel Lucent, "Analysis of small data transmission solutions involving SMS in EPS", 3GPP TSG SA WG3 (Security) meeting #64, S3-110648, Jul. 2011.
Huawei et al., "General considerations on MTC WI", 3GPP TSG-RAN WG2 Meeting #71bis, R2-105632, pp. 1-4, Oct. 2010.
Japanese Office Action mailed Sep. 6, 2016, by the Japanese Patent Office in counterpart Japanese Patent Application No. 2015-241426.
Non-Final Office Action mailed May 25, 2016, in parent U.S. Appl. No. 14/233,649.
Non-Final Office Action mailed Jun. 16, 2016, in parent U.S. Appl. No. 14/991,699.
Final Office Action mailed Dec. 1, 2016, in counterpart U.S. Appl. No. 14/991,699.

* cited by examiner

COMMUNICATION SYSTEM, METHOD, AND APPARATUS

REFERENCE TO RELATED APPLICATION

This application is a divisional of U.S. application Ser. No. 14/233,649, filed on Jan. 17, 2014, which is a National Stage Entry of International Application No. PCT/JP2012/075219, filed on Sep. 28, 2012, which is based upon and claims the benefit of priority from Japanese patent application No. 2011-217384, filed on Sep. 30, 2011. The entire contents of the above-referenced applications are expressly incorporated herein by reference.

TECHNICAL FIELD

The present invention relates to a communication system, a method, and an apparatus.

BACKGROUND

In a core network of a mobile communication system, in order to provide various services to various kind of terminals (mobile stations), it is necessary that all of the nodes in the core network are provided with functions required for each service. In large-scale mobile communication network and the like, many nodes are arranged in the core network. A terminal, on every location registration, is connected in a distributed manner to nodes in the core network.

Thus, all the nodes in the core network need to have necessary functions for each service (service providing functions). When even a part of the nodes in the core network do not have the necessary service providing functions for each service, service continuity for a terminal cannot be ensured.

For example, Patent Literature 1 discloses an arrangement for optimizing a packet forwarding path based on a type of a service utilized by a mobile station, wherein, when the mobile station utilizes a service from an external network, a constraint is given to a packet forwarding path so that packet flow through a specific packet forwarding apparatus based on the external network. When the mobile station utilized a service provided by a mobile communication network, no constraint is given to a packet forwarding path.

Patent Literature 1

Japanese Patent Kokai Publication No. 2003-338832A

SUMMARY

The following describes some analysis of the related technique.

As described above, since each node in a core network has all service providing functions, each node is required to have high functionality and high performance. Consequently, each core network node becomes expensive.

For example, since a relatively small number of mobile terminals are compatible with an MBMS (Multimedia Broadcast Multicast Service) service (a simultaneous delivery service), which is a bearer service that is standardized by 3GPP (3rd Generation Partnership Project) and that implements broadcast type delivery, there is not much opportunity to provide the MBMS service. However, to provide the service to a small number of MBMS users, it is necessary for a communication operator to have all the nodes in the core network equipped with the MBMS functions. Otherwise, the communication operator cannot provide the service to the small number of MBMS users.

If a node in the core network can be selected based on whether or not a mobile terminal needs to use the MBMS service, the communication operator can install a relatively small number of expensive core network nodes that are compatible with the MBMS and many inexpensive core network nodes that are not compatible with the MBMS in combination. In this way, the equipment cost as a whole can be reduced more efficiently (first knowledge of the present inventors).

In addition, 3GPP machine communication (MTC: Machine Type Communication) devices (M2M devices), which have been in widespread use in recent years, greatly differ from normal terminals used for phone calls (handset terminals) such as mobile phone terminals and smart-phones or the like, in terms of a mobility characteristic, a required communication quality, and so forth. It is known that there are various types of machine communication services, such as for remote management of stocks and charging of automatic vending machines, remote monitoring control in a sensor system, vehicle monitoring, and smart grid.

In core network nodes, for example, MTC-compatible nodes are customized to be suitable for accommodating a terminal (MTC device) that exchanges more control signals and less user data than normal nodes (for example, these MTC-compatible nodes are customized so that, while a performance of a user plane in which user data is exchanged is reduced for cost reduction, a performance of a control plane of a control signal system is improved). Thus, unless the communication operator makes all the core network nodes equipped with necessary capabilities and functions to successfully connect to an MTC devices and a handset terminal, the communication operator cannot provide the service to both of the MTC device and the handset terminal. The same applies to the MBMS service.

If an MTC device and a handset terminal could respectively be connected to appropriate core network nodes, the communication operator is allowed to arrange relatively inexpensive core network nodes for a handset terminal and relatively inexpensive core network nodes for a MTC device in combination (second knowledge of the present inventors).

If this is the case, compared with installing relatively expensive core network nodes, each of which is compatible with both of a handset terminal and a MTC device, an equipment cost in a whole system can be reduced more efficiently (third knowledge of the present inventors).

Thus, the present invention has been made to solve the above issues, and an object of the present invention is to provide a system, a method, and a device for reducing an equipment cost in an entirety of a system more efficiently and achieving cost reduction.

The present invention that solves the above issues generally has the following configuration (but not limited thereto).

According to an aspect of the present invention, there is provided a communication system including a core network for a mobile communication system, wherein the core network comprises a plurality of nodes, each node serving as a node to manage mobility of a terminal, the plurality of nodes being different to each other with regard to service functions that the nodes provide to a terminal, and wherein based on subscriber information and terminal information, a node to be connected to the terminal is selected from among the plurality of nodes, depending on a service characteristic utilized by the terminal or on a type of the terminal, and the terminal is connected to the selected node. There is also provided a mobile communication system, comprising:

a terminal (UE (User Equipment) or MS (Mobile Station)) supporting a function associated with MTC (Machine Type Communication);

a base station; and a specific MME (Mobility Management Entity) or SGSN (a Serving GPRS (General Packet Radio Service) Support Node), wherein the terminal supporting the function associated with MTC is configured to provide the base station with information indicating that an RRC (Radio Resource Control) connection request includes the function, and wherein the base station is configured to use the indication information provided by the terminal supporting the function to steer the terminal supporting the function to the specific MME or SGSN, or to select the specific MME or SGSN.

According to another aspect of the present invention, there is provided a communication method, comprising:

arranging a plurality of nodes for the terminal in a mobile communication system core network, the nodes serving as nodes for managing mobility of a terminal, and being different to each other with regard to service functions that the nodes provide to a terminal;

selecting, based on subscriber information and terminal information, a node to be connected to the terminal from among the plurality of nodes, depending on characteristics of a service used by the terminal or on a type of the terminal; and connecting the terminal to the selected node. There is also provided a communication method for a mobile communication system comprising at least a terminal (UE (User Equipment) or an MS (Mobile Station)) supporting a function relating to MTC (Machine Type Communication), a base station, and a specific MME (Mobility Management Entity) or SGSN (Serving GPRS (General Packet Radio Service) Support Node), the method comprising:

the terminal supporting the function providing the base station with information indicating that an RRC (Radio Resource Control) connection request includes the function; and the base station using the indication information provided by the terminal to steer the terminal supporting the function to the specific MME or SGSN, or to select the specific MME or SGSN.

According to another aspect of the present invention, there is provided a node apparatus that performs control to select, as a mobility management node apparatus to manage mobility of a terminal, another mobility management node apparatus compatible with a service characteristic utilized by the terminal or a type of the terminal, based on subscriber information and terminal information to connect the terminal to the selected another mobility management node apparatus. There is also provided a base station in a mobile communication system comprising at least a terminal (UE (User Equipment) or an MS (Mobile Station)) supporting a function relating to MTC (Machine Type Communication) and a specific MME (Mobility Management Entity) or SGSN (Serving GPRS (General Packet Radio Service) Support Node), wherein the base station comprises a unit configured to receive information indicating that an RRC (Radio Resource Control) connection request includes the function from the terminal supporting the function, and a unit configured to use the indication information provided by the terminal supporting the function to steer the terminal supporting the function to the specific MME or SGSN, or to select the specific MME or SGSN. There is also provided a terminal in a mobile communication system comprising at least a base station and a specific MME (Mobility Management Entity) or SGSN (Serving GPRS (General Packet Radio Service) Support Node), and that is a terminal (UE (User Equipment) or an MS (Mobile Station)) supporting a function relating to MTC (Machine Type Communication), the terminal comprising a unit configured to provide the base station with information indicating that an RRC (Radio Resource Control) connection request includes the function and a unit configured to cause the base station to use the indication information provided by the terminal to steer the terminal supporting the function to the specific MME or SGSN, or to select the specific MME or SGSN.

According to the present invention, cost reduction can be achieved by reducing the equipment cost in the whole core network system more efficiently.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED MODES

Figure 1:
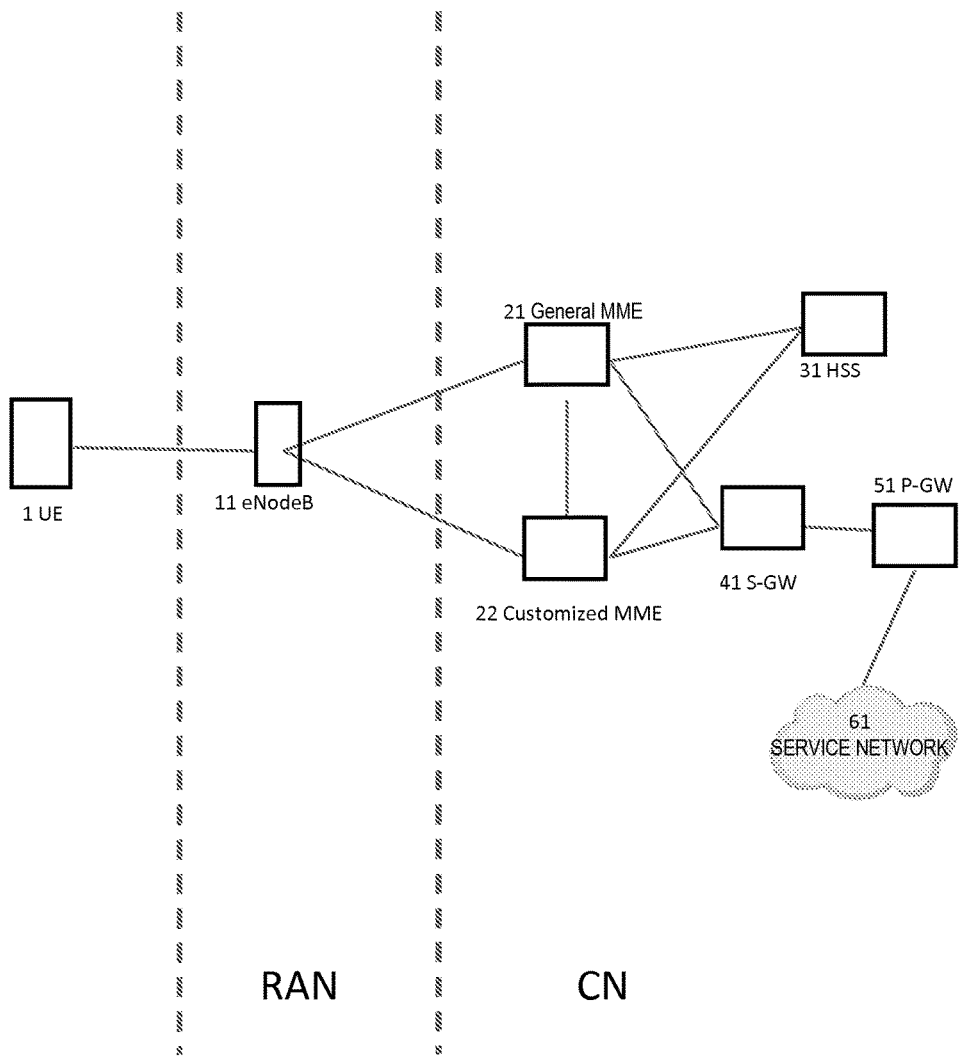
FIG. 1 is a diagram illustrating a system configuration according to a first exemplary embodiment of the present invention.

First, an outline of the present invention will be described with reference to FIGS. 1 and 2. According to the present invention, a core network includes a plurality of nodes (21/22 in FIG. 1 or 121/122 in FIG. 2) that are different to each other with respect to service functions provided for a terminal. Based on subscriber information and terminal information, a node to be connected to the terminal is selected from the plurality of nodes, in accordance with a service characteristic utilized by the terminal or on a type of the terminal. The terminal (1 in FIG. 1 or 101 in FIG. 2) is connected to the selected node. Namely, in the core network, a node with a predetermined specific service providing function (22 in FIG. 1 or 122 in FIG. 2) and a node without the specific service providing function (21 in FIG. 1 or 121 in FIG. 2) are installed in combination.

Thus, according to the present invention, by installing both types, namely, a node optimized with the specific service providing function and a node without the specific service providing function as the nodes that can be connected to the terminal(s), the cost in the whole system can be reduced further, as compared with cases in which all the nodes in the core network are provided with capabilities and functions for all services.

According to the present invention, in a mobile terminal communication network, a terminal can be connected to a specific core network node, depending on a condition such as a service characteristic or a terminal type.

<Mode 1>

A General MME (a mobility management entity), upon reception of an Attach Request from a UE (User Equipment, also termed as a user device, a terminal, or a mobile station) determines whether the UE is of a type that uses a specific service, based on subscriber information and terminal information. When the UE is this type, in order to connect the UE to a Customized MME, the General MME transmits an MME re-selection request signal (a mobility management entity re-selection request signal) to an eNodeB (evolved NodeB: a base station apparatus).

By re-transmitting, by the eNodeB, an Attach Request to the Customized MME, the UE is connected to the Customized MME.

<Mode 2>

A General MME, upon reception of an Attach Request from a UE, transmits an MME change request signal (a mobility management entity change request signal) to the Customized MME, in order to connect the UE to a Customized MME. By continuing an Attach Procedure by the Customized MME, the UE is connected to the Customized MME.

<Mode 3>

A General MME, upon reception of an Attach Request from a UE, transmits, to the UE, an Attach Reject, to which is added an identifier of the Customized MME, in order to connect the UE to a Customized MME. The UE, by re-transmitting an Attach Request, to which is added the identifier of the Customized MME to an Attach Request by the UE, is connected to the Customized MME.

<Mode 4>

A UE transmits, to an eNodeB, an RRC (Radio Resource Control) Connection Request (radio resource connection request), to which is added connection request information requesting connection to a Customized MME (specific MME). The eNodeB, which has received the RRC connection request, when transmitting, to an MME, an Attach Request from the UE with RRC Connection established, selects the Customized MME to make the UE connected to the Customized MME.

<Mode 5>

When a General MME with a session with a UE being established, performs release (S1 Release) of S1 connection established between an eNodeB and the General MME, the General MME instructs the eNodeB to select a Customized MME, in next selection of an MME. Then after, when the UE transmits a location management area update request (a TA (Tracking Area) Update Request), the eNodeB selects the Customized MME to make the UE connected to the Customized MME.

<Mode 6>

A General SGSN (Serving GPRS (General Radio Packet Service) Support Node: which is described as "serving GPRS support node" in the claims), upon reception of an Attach Request from a UE, determines whether the UE is of a type that uses a specific service based on subscriber information and terminal information. If the UE is this type, in order to connect the UE to a Customized SGSN, the General SGSN transmits an SGSN re-selection request signal to an RNC (a Radio Network controller). By transmitting an Attach Request to the Customized SGSN, the RNC make the UE connected to the Customized SGSN.

<Mode 7>

A General SGSN, upon reception of an Attach Request from a UE, transmits an SGSN change request signal to the Customized SGSN, in order to connect the UE to a Customized SGSN. By continuing an Attach Procedure by the Customized SGSN, the UE is connected to the Customized SGSN.

<Mode 8>

A General SGSN, upon reception of an Attach Request from a UE, transmits, the UE, an Attach Reject, to which is added an identifier of the Customized SGSN, in order to connect the UE to a Customized SGSN. The UE, by re-transmitting an Attach Request, to which is added the identifier of the Customized SGSN to an Attach Request, is connected to the Customized SGSN.

<Mode 9>

A UE transmits, to an RNC, a connection request (an RRC Connection Request), to which is added connection request information requesting connection to a Customized SGSN. The RNC, which has received the RRC connection request, when transmitting, to an SGSN, an Attach Request from the UE with RRC Connection established, selects the Customized SGSN to make the UE connected to the Customized SGSN.

<Mode 10>

When a General SGSN with a session with a UE being established, performs Iu Release, the General SGSN instructs an RNC to select a Customized SGSN, in next selection of an SGSN. Then after, when the UE transmits a location management area update request (an RA (Routing Area) Update Request), the RNC selects the Customized SGSN to make the UE connected to the Customized SGSN.

As described in the above Modes 1 to 10, according to the present invention, a core network node is selected and connected to a terminal, based on characteristics of a service used by the terminal. In this way, in the core network, nodes with specific service providing functions and nodes without such functions can be arranged in combination. Namely, the nodes can be distinguished, by optimizing specific nodes to have specific service providing functions and by configuring other nodes without such specific service providing functions. As a result, the equipment cost in the whole system can be reduced. The following describes exemplary embodiments and specific examples with reference to the drawings.

Exemplary Embodiment 1

FIG. 1 illustrates exemplary embodiment 1 of the present invention. As exemplary embodiment 1, a configuration with EPC (Evolved Packet Core) will be described. In this configuration, a UE transmits an Attach Request and the UE is connected to a Customized MME.

In FIG. 1, a UE 1 (user equipment) is a terminal that receives a service from a Customized MME. For example, the UE 1 may be the above described MTC device, MBMS-compatible terminal or the like. In the case wherein the UE 1 is a normal mobile station that utilizes a normal service, such as a mobile phone terminal or a smartphone (a terminal that is not compatible with a specific service such as MTC or MBMS), the UE 1 is connected to a General MME. In addition, as will be described below, when the Customized MME is selected in response to an Attach Request from a normal mobile station (for example, from a terminal that is not compatible with a specific service such as MTC or MBMS), re-selection of an MME is performed and UE 1 is re-connected to the General MME.

An eNodeB 11 is a base station apparatus in LTE (Long Term Evolution).

An MME 21 and an MME 22 are mobility management devices introduced in EPC. The Customized MME 22 is a Customized MME to which the UE 1 needs to be connected and the General MME (21) is an MME other than such Customized MME. Though not limited thereto, the Customized MME 22, for example, may be configured, as an MME customized for a machine communication (MTC) service and for terminals compatible therewith (M2M devices) (for example, the C-Plane handling network control is reinforced). Or, the Customized MME 22 may be configured as an MBMS-compatible MME.

An HSS (Home Subscriber Server) 31 is a database storing subscriber information.

An S-GW (Serving GateWay) 41 and a P-GW (Packet data network GateWay) 51 are apparatuses handling the user plane.

A service network 61 is an external network.

In FIG. 1, the eNodeB corresponds to an apparatus in a radio access network (RAN) and the MMEs, the S-GW, the P-GW, and so forth correspond to apparatuses in a core network (CN).

Next, the above exemplary embodiment 1 will be described based on several examples. Different control schemes are described in the respective examples. Examples 1 to 5 correspond to the above Modes 1 to 5, respectively.

Example 1

Figure 3:
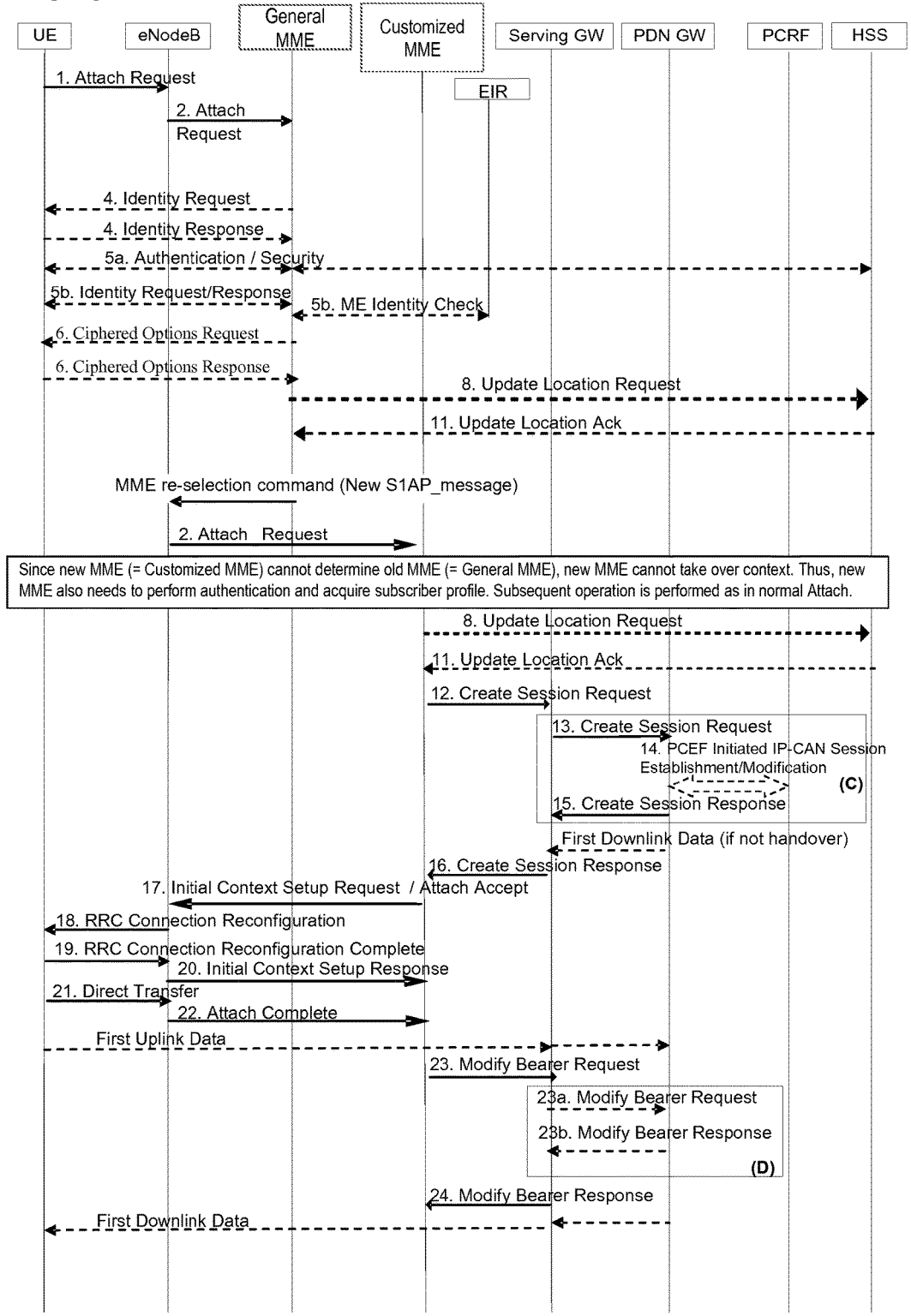
FIG. 3 is a diagram illustrating a sequence according to a first example of the present invention.

FIG. 3 is a sequence diagram illustrating an operation according to example 1.
In FIG. 3,
UE corresponds to the UE 1 in FIG. 1,
eNodeB corresponds to eNodeB 11 in FIG. 1,
General MME" corresponds to the General MME 21 in FIG. 1,
Customized MME corresponds to the Customized MME 22 in FIG. 1,
Serving GW corresponds to the S-GW 41 in FIG. 1,
PDN GW corresponds to the P-GW 51 in FIG. 1, and
HSS corresponds to the HSS 31 in FIG. 1.

"PCRF" is a Policy and Charging Rules Function. In addition, an EIR (Equipment Identity Register) stores IMEI (International Mobile Equipment Identity) and the like and is connected to an MME via an S13 interface.

In FIG. 3, for example, "1. Attach Request" represents that transmission of an Attach Request from the UE to the eNodeB is sequence 1. To distinguish the reference character of this sequence from reference character 1 of the UE in FIG. 1 (from the reference characters of the components), this sequence number 1 will be represented in parentheses as "Attach Request (1)" in the following description. The other sequence numbers are also represented in the same way. In addition, the sequence numbers in FIG. 4 and in the subsequent sequence diagrams will also be represented in the same way. FIG. 3 is based on Figure 5.3.2.1-1: Attach Procedure in 3GPP TS23.401 and the sequence numbers are in accordance with this figure. Details of each sequence are described in 3GPP TS23.401 5.3.2. Hereinafter, the operation sequence will be described with reference to FIGS. 1 and 3.

As illustrated in FIG. 3, when the UE 1 transmits an Attach Request (1), first, the eNodeB 11 receives the Attach Request (1). Next, the eNodeB 11 relays the Attach Request (2) to an MME.

At this sequence, the eNodeB 11 cannot uniquely determine whether to forward the Attach Request (2) to the General MME 21 or to the Customized MME 22. Thus, there are cases where the eNodeB 11 forwards the Attach Request (2) to the General MME 21.

After receiving the Attach Request (2), the General MME 21 acquires terminal information (ME Identity) from the UE 1 via an Identity Request/Response (4, 5b).

It is noted that the General MME 21 transmits an ME Identity Check Request (5b) to an EIR, and the EIR retunes an ME Identity Check Ack (not illustrated) to the General MME. In addition, in coordination with the HSS 31, the General MME 21 performs authentication and acquires a subscriber profile. Namely, in this case, at least, the General MME 21 performs authentication and acquires a subscriber profile.

The General MME 21, on acquisition of the terminal information and the subscriber profile, determines whether to connect the UE 1 to the General MME 21 or to the Customized MME 22.

When the General MME 21 determines that the UE 1 needs to be connected to the General MME 21, the General MME 21 continues a normal Attach Procedure.

When the General MME 21 determines that the UE 1 needs to be connected to the Customized MME 22, the General MME 21 transmits, to the eNodeB 11, an MME selection signal (an MME re-selection command) (S1AP (S1 application) signal newly introduced in the present exemplary embodiment), in order to instruct re-selection of an MME.

In this sequence, the General MME 21 sets an identifier of the Customized MME 22 (for example, a GUMMEI (Globally Unique MME Identity)) in the MME re-selection Command signal. Namely, before creation of a bearer in the core network, the General MME 21 transmits, to the eNodeB, a re-selection request, in which the necessary information (GUMMEI) for selecting a new MME is included. The MMEs is equipped with a function of determining whether the UE is a re-selection target.

When the eNodeB 11 receives the MME re-selection Command signal, in accordance with the identifier set in this signal, the eNodeB 11 selects the Customized MME 22 and forwards the Attach Request (2) to the Customized MME 22. Since the Customized MME 22 needs an NAS (Non-Access Stratum) parameter of the Attach Request (used in authentication between the UE and the MME), the eNodeB 11 re-transmits the Attach Request. The eNodeB 11 needs to be equipped with a function of storing such NAS message.

Since the new MME (=the Customized MME 22) cannot determine the old MME (=the General MME), the new MME cannot take over Context from the old MME (=the General MME). Thus, the new MME (=the Customized MME: MME 22) also needs to perform authentication and acquire the subscriber profile.

After receiving the Attach Request signal, the Customized MME 22 acquires the terminal information via an Identity Request/Response. In addition, the Customized MME 22 performs authentication and acquires a subscriber profile in coordination with the HSS 31. Namely, the Customized MME 22 performs the same processing as that performed by the General MME 21.

After acquiring the terminal information and the subscriber profile, the Customized MME 22 determines whether to connect the UE 1 to the General MME 21 or to the Customized MME 22.

In this case, since the Customized MME 22 has been selected after re-selection by the eNodeB 11, the Customized MME 22 continues a normal Attach Procedure without transmitting an MME re-selection Command signal. Namely, the following sequences are performed:

- transmission of an Update Location Request (8) from the Customized MME 22 to the HSS 31,
- transmission of an Update Location Ack (11) from the HSS 31 to the Customized MME 22,
- transmission of a Create Session Request (12) from the Customized MME 22 to the S-GW 41,
- transmission of a Create Session Request (13) from the S-GW 41 to the P-GW 51,
- PCEF Initiated IP-CAN Session Establishment/Modification (14) by the P-GW 51,
- transmission of a Create Session Response (15) from the P-GW 51 to the S-GW 41,
- transmission of First Down Link Data from the P-GW 51 to the S-GW 41 (if not handover (HO)),
- transmission of a Create Session Response (16) from the S-GW 41 to the customized MME22,
- transmission of an Initial Context Setup Request/Attach Accept) (17) from the customized MME 22 to the eNodeB 11,
- transmission of an RRC Connection Reconfiguration (18) from the eNodeB 11 to the UE 1,
- transmission of an RRC Connection Reconfiguration Complete (19) from the UE 1 to the eNodeB 11,
- transmission of an Initial Context Setup Response (20) from the eNodeB 11 to the Customized MME 22,
- Direct Transfer (21) from the UE 1 to the eNodeB,
- transmission of an Attach Complete (22) from the eNodeB 11 to the Customized MME 22,
- transmission of First Uplink Data from the UE 1 to the S-GW 41 and the P-GW 51,
- transmission of a Modify Bearer Request (23) from the Customized MME 22 to the S-GW 41,
- transmission of a Modify Bearer Request (23a) from the S-GW 41 to the PDN,
- transmission of a Modify Bearer Response (23b) from the PDN to the S-GW 41,
- transmission of a Modify Bearer Response (24) from the S-GW 41 to the Customized MME 22, and
- transmission of First Downlink data from the P-GW 51 and the S-GW 41 to the UE 1.

In addition, the General MME 21 and the Customized MME 22 are equipped with a function of determining which MME needs to be connected to the UE 1. This determination is made based on information transmitted from the UE 1. The information may be:

- IMSI (International Mobile Subscriber Identity),
- IMEI (International Mobile Equipment Identity: (terminal Identity)),
- UE network capability,
- MS network capability,
- Mobile station classmark 2,
- Mobile station classmark 3,
- Device properties,
- a new parameter of an Attach Request signal which will be added in the future, or
- an identifier of a part of these parameters (for example, a PLMN (Public land Mobile Network)-id included in the IMSI).

Alternatively, the above determination may be made based on information transmitted from the HSS 31. The information may be:

- Feature-List,
- APN (Access Point Name),
- a new parameter of an Update Location Answer/Insert Subscriber Data Request signal which will be added in the future, or
- an identifier of a part of these parameters.

Any one of or a combination of these items of information may be used for the above determination.

In addition, in the present example, even when an Attach Request signal is forwarded from the UE 1 that needs to be connected to the General MME 21 to the Customized MME 22, the Customized MME 22 can request the eNodeB 11 to select the General MME 21 in a like manner. For example, if the UE 1 is a normal mobile station (for example, a normal mobile station that is not compatible with a special service such as MTC or MBMS) and if the UE 1 is first connected to the Customized MME 22, the General MME 21 is selected and a service is provided from the General MME 21.

As described above, in the present exemplary embodiment, an MME instructs the eNodeB to perform re-selection of an MME. In response to the instruction, the eNodeB performs re-selection of an MME and the Attach Procedure is continued. In this way, the UE can be attached to an appropriate MME.

Example 2

As example 2, another example with EPC (Evolved Packet Core) will be described. In this example, the UE transmits an Attach Request and the UE is connected to the Customized MME. In example 2, the same system configuration as that in example 1 will be used.

Figure 4:
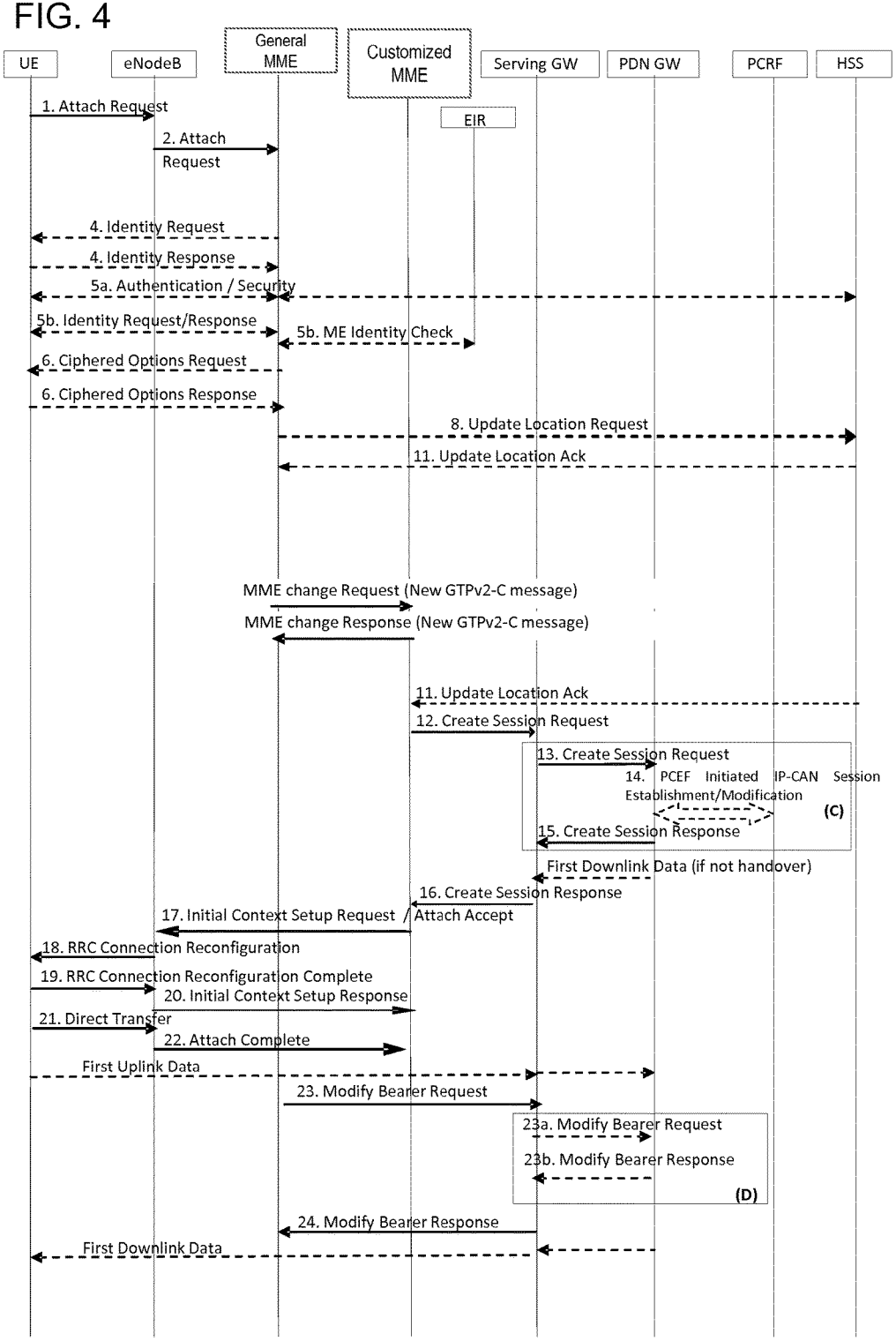
FIG. 4 is a diagram illustrating a sequence according to a second example of the present invention.

FIG. 4 is a sequence diagram illustrating an operation according to example 2. FIG. 4 is based on Figure 5.3.2.1-1: Attach Procedure in 3GPP TS23.401 and the sequence numbers are in accordance with this figure. Details of each sequence are described in 3GPP TS23.401 5.3.2. Hereinafter, the operation will be described with reference to FIGS. 1 and 4.

When the UE 1 transmits an Attach Request (1), the eNodeB 11 receives the Attach Request (1). Next, the eNodeB 11 relays the Attach Request (2) to an MME. At this sequence, the eNodeB 11 cannot uniquely determine whether to forward the Attach Request (2) to the General MME 21 or to the Customized MME 22. Thus, there are cases where the eNodeB 11 forwards the Attach Request (2) to the General MME 21.

After receiving the Attach Request (2), the General MME 21 acquires terminal information (ME Identity) via an Identity Request/Response (5b). In addition, in coordination with the HSS 31, the General MME 21 performs authentication and acquires a subscriber profile. Namely, in this case, at least, the General MME 21 performs authentication and acquires a subscriber profile.

After acquiring the terminal information and the subscriber profile, the General MME 21 determines whether to connect the UE 1 to the General MME 21 or to the Customized MME 22. If the General MME 21 determines that the UE 1 needs to be connected to the General MME 21, the General MME 21 continues a normal Attach procedure.

If the General MME 21 determines that the UE 1 needs to be connected to the Customized MME 22, to instruct change of an MME, the General MME 21 transmits an MME change request signal (MME Change Request) (a GTP (GPRS Tunneling Protocol) signal newly introduced in the present example) to the Customized MME 22.

In this sequence, the General MME 21 sets context information generated by authentication of the terminal and acquisition of the subscriber profile in the MME change request signal (MME Change Request).

The Customized MME 22, upon reception of the MME change request signal (MME Change Request), holds the context information set in the MME change request signal and transmits an MME Change Response signal (a GTP signal newly introduced in the present example) to the General MME 21.

Subsequently, the Customized MME 22 transmits an Update Location Request (8) to the HSS 31 to notify the HSS 31 of change of the MME.

In order to notify the HSS 31 of the changed MME, the Customized MME 22 transmits an Update Location Request. The subsequent Attach Procedure is performed by the Customized MME 22.

The Customized MME 22, in the case wherein security context information received from the General MME 21 is valid, can omit performing re-authentication.

Subsequently, the Customized MME 22 continues the Attach Procedure and the eNodeB 11 receives an Initial Context Setup Request/Attach Accept) (17) from the Customized MME 22.

The Initial Context Setup Request/Attach Accept (17) is a response to the Attach Request (2) received by the General MME 21. The eNodeB 11 needs to include a function of receiving a Response from another MME different from the General MME 21.

Subsequently, the Customized MME 22 continues a normal Attach Procedure.

The General MME 21 and the Customized MME 22 are equipped with a function of determining which MME needs to be connected to the UE 1, as is the case with example 1.

In addition, in the present example, even when an Attach Request signal is forwarded from the UE 1 that needs to be connected to the General MME 21 to the Customized MME 22, the Customized MME 22 can request the General MME 21 for change of an MME in a like manner. For example, in the case wherein the UE 1 is a normal mobile station (for example, a normal mobile station that is not compatible with a special service such as MTC or MBMS), when the UE 1 is once connected to the Customized MME 22, the Customized MME 22 transmits an MME change request signal (MME Change Request) to the General MME 21. In this way, the General MME 21 is selected and a service is provided from the General MME 21.

As described above, in the present example, the General MME instructs the Customized MME about change of an MME. In response to the instruction, the Customized MME accepts the change and continues the Attach Procedure. In this way, the UE can be attached to an appropriate MME.

Example 3

As example 3, another example with EPC will be described. In this example, the UE transmits an Attach Request and the UE is connected to the Customized MME. In example 3, the same system configuration as that in example 1 will be used.

Figure 5:
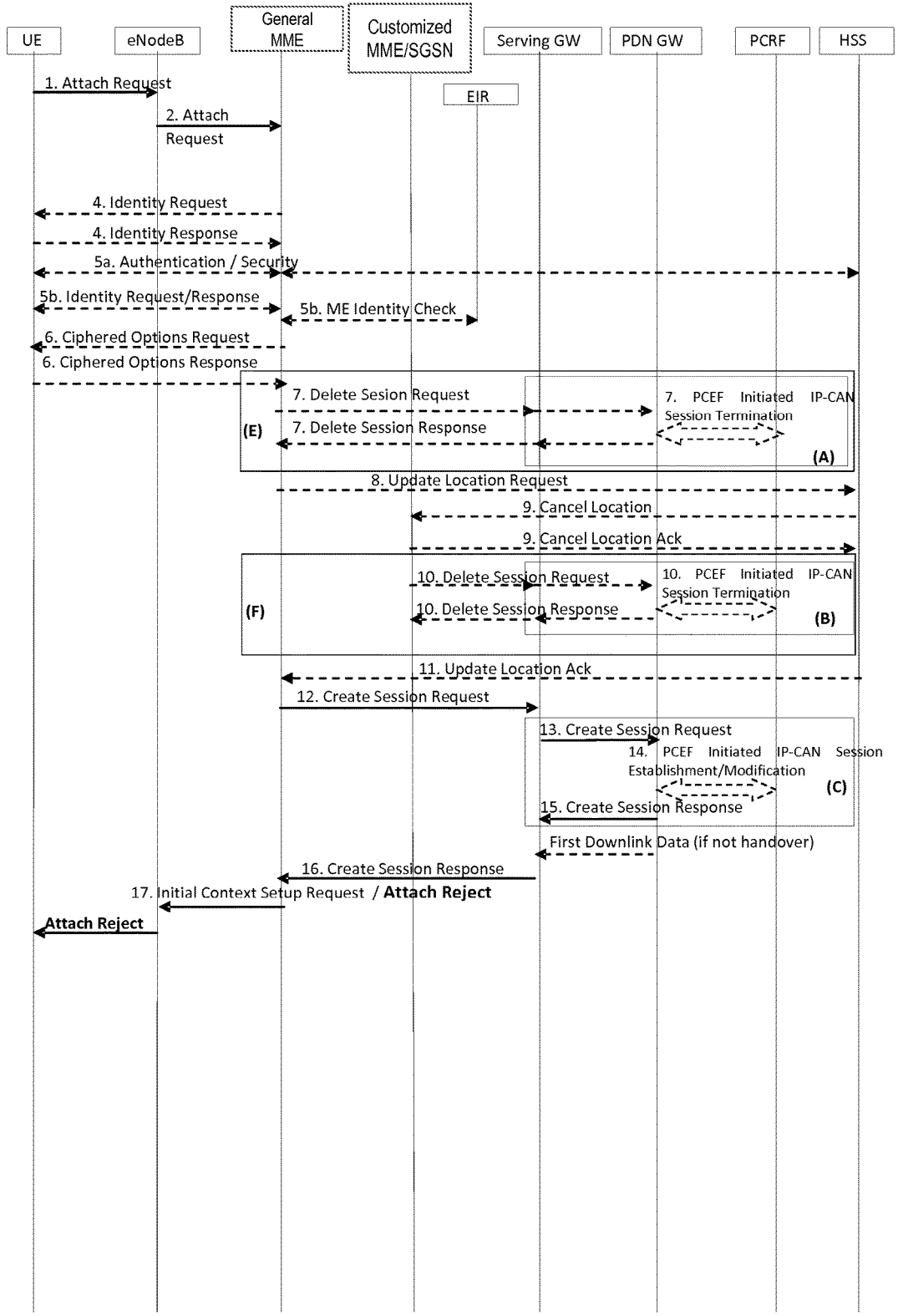
FIG. 5 is a diagram illustrating a sequence according to a third example of the present invention.
Figure 6:
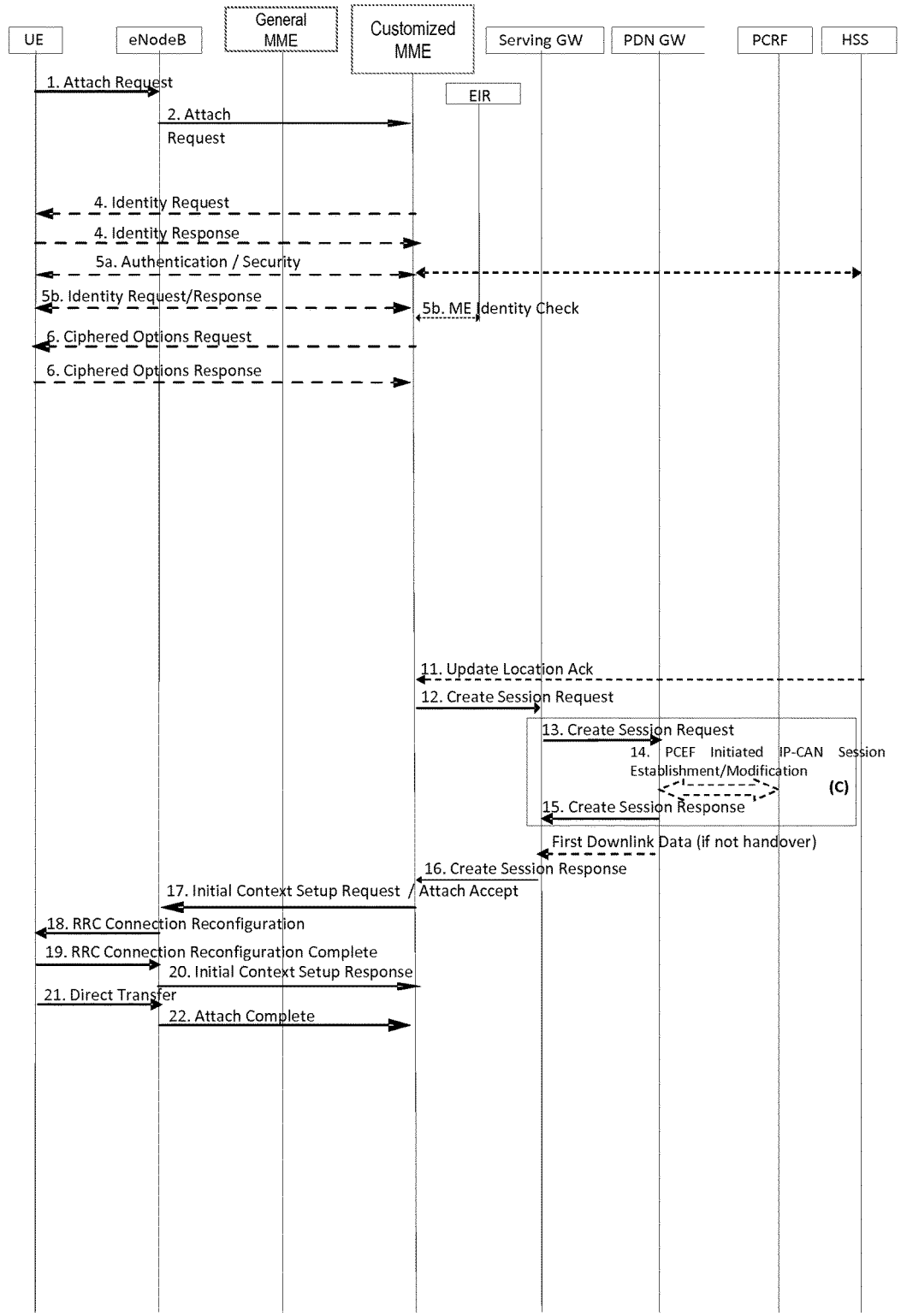
FIG. 6 is a diagram illustrating a sequence according to the third example of the present invention.

FIGS. 5 and 6 are sequence diagrams illustrating an operation according to example 3. FIGS. 5 and 6 are based on Figure 5.3.2.1-1: Attach Procedure in 3GPP TS23.401 and the sequence numbers are in accordance with these figures. Details of each sequence are described in 3GPP TS23.401 5.3.2. Hereinafter, the operation will be described with reference to FIGS. 1, 5, and 6.

When the UE 1 transmits an Attach Request (1), first, the eNodeB 11 receives the Attach Request (1). Next, the eNodeB 11 forwards the Attach Request (2) to an MME. However, the eNodeB 11 cannot uniquely determine whether to forward the Attach Request (2) to the General MME 21 or to the Customized MME 22. Thus, there are cases where the eNodeB 11 forwards the Attach Request (2) to the General MME 21.

After receiving the Attach Request (2), the General MME 21 acquires terminal information (ME Identity) via an Identity Request/Response (5b). In addition, in coordination with the HSS 31, the General MME 21 performs authentication and acquires a subscriber profile.

The General MME 21, on acquisition of the terminal information and the subscriber profile, determines whether to connect the UE 1 to the General MME 21 or to the Customized MME 22. If the UE 1 is to be connected to the General MME 21, the General MME 21 continues a normal Attach Procedure.

If the UE 1 needs to be connected to the Customized MME 22, the General MME 21 transmits an Attach Reject message to the UE 1, instead of continuing the Attach Procedure. Namely, the General MME 21 transmits an Initial Context Setup Request/Attach Reject (17) to the eNodeB 11.

In this sequence, the General MME 21 sets a parameter for instructing re-Attach (a new parameter introduced in the present example) and a GUTI (Globally Unique Temporary Identity (Identifier)) parameter including a GUMMEI (Globally Unique MME identifier) (a new parameter introduced in the present example) in the Attach Reject signal, so that the eNodeB 11 can select the Customized MME 22 when performing re-Attach. The GUTI parameter is formed by a GUMMEI and an M-TMSI (Temporary Mobile Station Identity). An MMEI is formed by an MCC (Mobile Country Code), an MNC (Mobile Network Code), and an MME Identifier. While these parameters are parameters that are newly introduced in the present example, since the eNodeB 11 is transparent, the eNodeB 11 is not affected.

The UE 1, upon reception of the Attach Reject signal from the eNodeB 11, as illustrated in FIG. 6, transmits, to the eNodeB 11, the Attach Request (1) in which the GUTI is set (Attach by the GUTI), in accordance with the parameter for instructing re-Attach set in the Attach-Reject signal and the GUTI parameter. The eNodeB 11 decides an appropriate MME from the GUMMEI included in the GUTI and forwards the Attach Request (2) to the Customized MME 22.

The UE 1 is equipped with a function of receiving a GUTI in an Attach Reject signal and using the GUTI specified in the Attach Reject when transmitting a re-Attach (Attach Request (1) in FIG. 6). The MMEs are equipped with a function of determining whether this UE is a re-selection target.

Subsequently, the Customized MME 22 continues a normal Attach Procedure. While the GUTI is set in the Attach Request, the Customized MME 22 does not hold context information.

Thus, upon reception of the Attach Request signal, the Customized MME 22 acquires terminal information via an Identity Request/Response (4). In addition, the Customized MME 22 performs authentication and acquires a subscriber profile in coordination with the HSS 31.

In addition, the General MME 21 and the Customized MME 22 are equipped with a function of determining which MME needs to be connected to the UE 1, as is the case with example 1.

In addition, in the present example, even when an Attach Request signal is forwarded from the UE 1 that needs to be connected to the General MME 21 to the Customized MME 22, the Customized MME 22 can urge the UE 1 to re-select an MME in the same manner. Namely, in the case wherein the UE 1 is a normal mobile station (for example, a normal mobile station that is not compatible with a special service such as MTC or MBMS), when the UE 1 is once connected to the Customized MME 22, the Customized MME 22 transmits an Attach Reject signal to the UE 1 and urges the UE 1 to re-select the General MME 21. In this way, since the UE 1 transmits a re-Attach Request signal, the General MME 21 is selected and a service is provided from the General MME 21.

As described above, in the present example, the General MME instructs the UE to perform re-selection of an MME. In response to the instruction, the UE specifies the Customized MME and an Attach Procedure is continued. In this way, the UE can be attached to an appropriate MME.

Example 4

Figure 7:
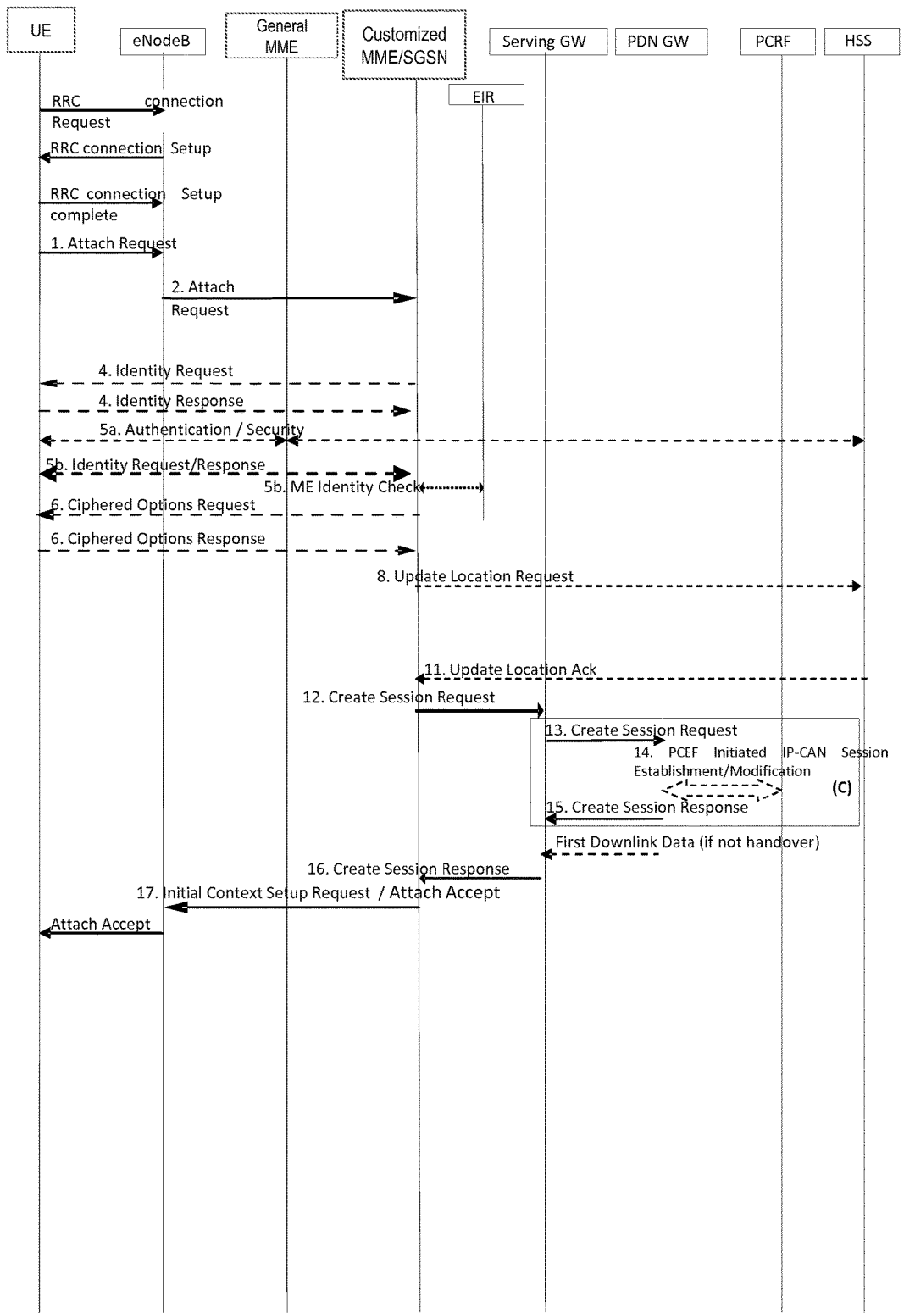
FIG. 7 is a diagram illustrating a sequence according to a fourth example of the present invention.

As example 4, another example with EPC will be described. In this example, the UE transmits an Attach Request and the UE is connected to the Customized MME. In example 4, the same system configuration as that in example 1 will be used. FIG. 7 is a sequence diagram illustrating an operation according to example 4. FIG. 7 is based on Figure 5.3.2.1-1: Attach Procedure in 3GPP TS23.401 and the sequence numbers are in accordance with the figure. Details of each sequence are described in 3GPP TS23.401 5.3.2. Hereinafter, the operation will be described with reference to FIGS. 1 and 7.

In order to transmit an Attach Request (1) to an MME, the UE 1 first, establishes RRC Connection with the eNodeB 11. In order to establish RRC Connection, first, the UE 1 transmits an RRC Connection Request signal to the eNodeB 11.

In this sequence, the UE 1 sets a parameter indicating that the UE 1 needs to be connected to the Customized MME 22 (a User Identity, a new Value or a new parameter of establishment Cause (a value or a parameter newly introduced in the present example), or an identifier of a part of such parameters (a PLMN-id included in the IMSI, for example)).

A new parameter of the RRC Connection Request (a new value or a new parameter of establishment Cause) is implemented, so that the UE 1 can notify the eNodeB that the UE 1 can be connected to the Customized MME by using the RRC Connection Request.

The eNodeB 11, upon reception of the RRC Connection Request signal, stores information indicating that the UE 1 needs to be connected to the Customized MME 22 and continues the subsequent RRC Connection Procedure.

After establishing RRC Connection, when the UE 1 transmits an Attach Request (1), the eNodeB 11 receives the Attach Request (1). In this sequence, the eNodeB 11, from the information stored upon reception of the RRC Connection Request (1), forwards an Attach Request (2) to the Customized MME 22.

After receiving the Attach Request (2), the Customized MME 22 continues a normal Attach Procedure.

In addition, the UE 1 is equipped with a function of instructing the eNodeB 11 about which one of the General MME 21 and the Customized MME 22 needs to be connected to the UE 1. Since the UE 1 cannot store information about all the MMEs in the core network, information indicating an MME type, a service type, or the like is used for the instruction given to the eNodeB 11, instead of an identifier by which a unique MME can be selected.

In addition, the eNodeB 11 is equipped with a function of determining which MME needs to be connected to the UE 1.

As described above, one of or a combination of a User Identity, a new Value or a new parameter of Establishment Cause, and an identifier of a part of such parameters in the RRC Connection Request message is used for selection of an MME by the eNodeB 11.

As described above, in the present example, the UE instructs the eNodeB to select an MME. In response to the instruction, the eNodeB specifies the Customized MME and an Attach Procedure is continued. In this way, the UE can be attached to an appropriate MME.

Example 5

As example 5, another example with EPC will be described. In this example, the UE and the Customized MME are connected when Tracking Area Update is performed. In example 5, the same system configuration as that in example 1 will be used.

Figure 8:
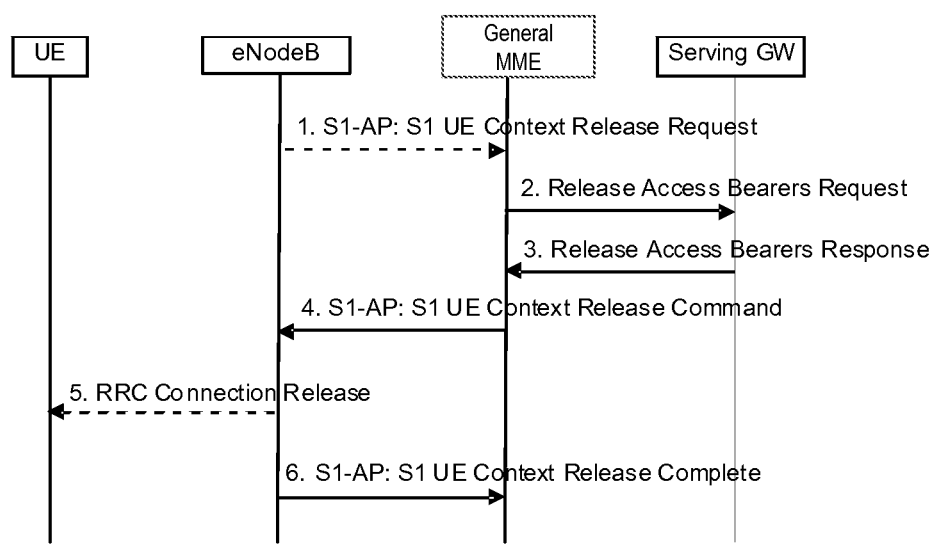
FIG. 8 is a diagram illustrating a sequence according to a fifth example of the present invention.
Figure 9:
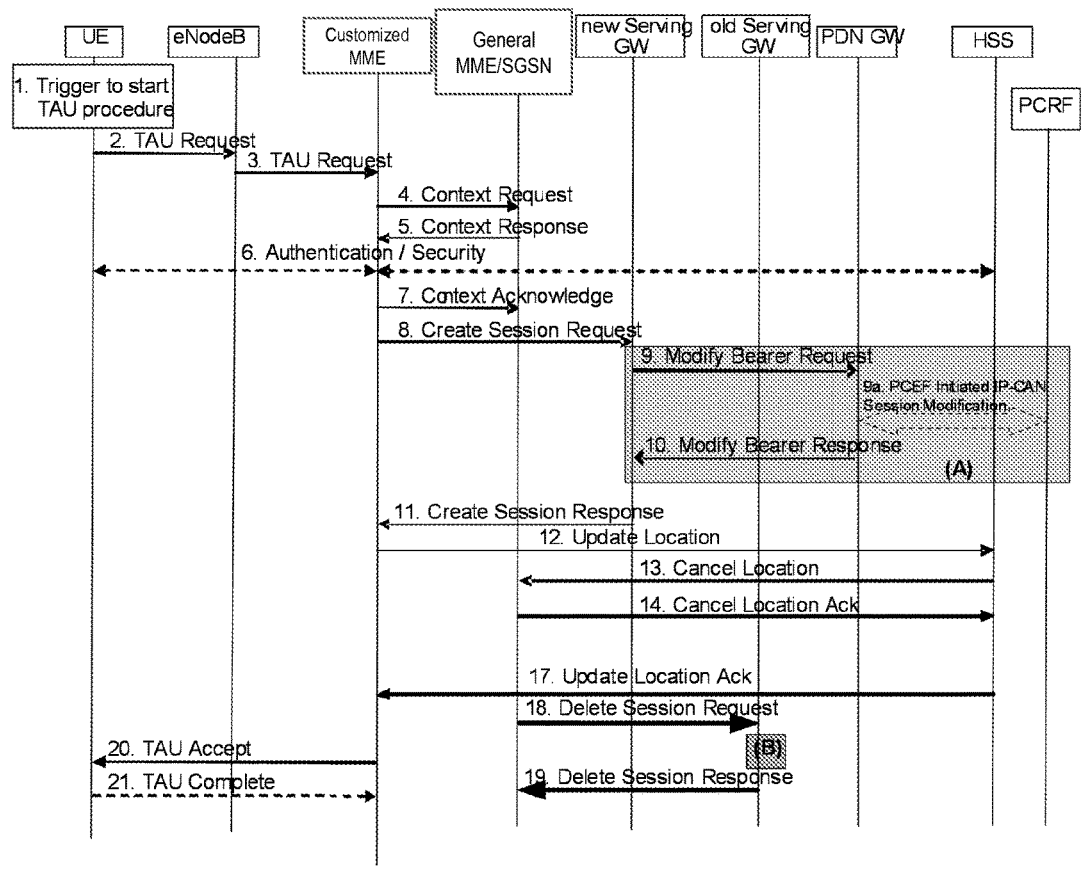
FIG. 9 is a diagram illustrating a sequence according to the fifth example of the present invention.

FIGS. 8 and 9 are sequence diagrams illustrating an operation according to example 5. FIG. 8 is based on Figure 5.3.5-1: S1 Release Procedure in 3GPP TS23.401 (see 3GPP TS23.401 5.3.5). FIG. 9 is based on Figure 5.3.3.1-1: Tracking Area Update procedure with Serving GW change (see 3GPP TS23.401 5.3.3). The operation will be described with reference to FIGS. 1, 8, and 9 (and a part in FIG. 3).

When the UE 1 transmits an Attach Request (see 1 in FIG. 3), first, the eNodeB 11 receives the Attach Request. The eNodeB 11 relays the Attach Request to an MME (see 2 in FIG. 3).

The eNodeB 11 cannot uniquely determine whether to forward the Attach Request to the General MME 21 or to the Customized MME 22. Thus, there are cases where the eNodeB 11 forwards the Attach Request to the General MME 21.

After receiving the Attach Request, the General MME 21 acquires terminal information (ME Identity) via an Identity Request/Response (see 4, 5b in FIG. 3). In addition, the General MME 21 performs authentication and acquires a subscriber profile in coordination with the HSS 31.

The General MME 21, on acquisition of the terminal information and the subscriber profile, determines whether to connect the UE 1 to the General MME 21 or to the Customized MME 22. Subsequently, a normal Attach Procedure is continued. If the UE 1 is to be connected to the General MME 21, processing completes at this point.

If the UE 1 needs to be connected to the Customized MME 22, the General MME 21 performs S1 Release to cause the UE 1 to perform Tracking Area Update (TA Update), as illustrated in FIG. 8. The General MME 21 transmits an S1 UE Context Release Command (4) to the eNodeB 11.

The General MME 21 gives an instruction about an MME that the eNodeB needs to select when establishing S1 Connection with an MME next time, by using an MME identifier (for example, a GUMMEI) in the S1 UE Context Release Command (4). A parameter, for example, the GUMMEI specifying the next MME to be selected by the eNodeB when S1 Release for activation of Load Balancing TAU is performed, is a new parameter. Even after S1 Release is completed, while the eNodeB 11 is holding session information for the UE 1, the eNodeB 11 continues to hold the MME identifier as information for selection of the next MME.

After S1 Release being performed, next, the UE 1 transmits a TAU Request (2), as illustrated in FIG. 9. First, the eNodeB 11 receives the TAU Request (2) from the UE 1 and forwards the TAU Request (3) to an MME. The eNodeB 11, as in a state of S1 Release being completed, performs re-selection of an MME and establishes S1 Connection. The eNodeB 11 selects the Customized MME, in accordance with the GUMMEI indicated by the old MME (=the General MME) at the time of S1 Release. The eNodeB 11 is equipped with a function of holding the next GUMMEI per UE.

When selecting an MME, the eNodeB 11 selects the Customized MME 22 in accordance with the MME Identifier of the GUMMEI indicated in the S1 UE Context Release Command signal received from the General MME 21. Since the GUTI (GUMMEI) on NAS indicates the old MME (=General MME), m contexts can be acquired.

After receiving the TAU Request (3), the Customized MME 22 continues a normal TA Update Procedure. The Customized MME 22 transmits a Context Request (4) to the General MME 21 and receives a Context Response (5).

The Customized MME 22, in the case wherein the S-GW is relocated, transmits a Context Acknowledge (7) including an instruction for changing the S-GW to the General MME. When the Customized MME 22 selects a new S-GW 41 (new Serving GW), the Customized MME 22 transmits a Create Session Request (8) to the new S-GW 41.

The new S-GW 41 (new Serving GW), responsive to this Create Session Request (8), transmits a Modify Bearer Request (9) to the P-GW 51. After receiving a response to the Modify Bearer Request (9) from the P-GW 51, the new S-GW returns a Create Session Response (11) to the Customized MME 22.

The Customized MME 22 transmits an Update Location (12) to the HSS 31.

The General MME 21, upon reception of a Cancel Location (13) from the HSS 31, deletes MM contexts and transmits a Cancel Location Ack (14) to the HSS 31. The HSS 31 transmits an Update Location Ack (17) in response to the Update Location (12) to the Customized MME 22.

The General MME 21 transmits a Delete Session Request (18) to the old S-GW 41 (old Serving GW), and the old S-GW 41 (old Serving GW) transmits a response (19) to the Delete Session Request (18) to the General MME 21.

The Customized MME 22 transmits a TAU Accept (20) to the UE 1.

If a GUTI is included in the TAU Accept (20), the UE 1 returns a TAU Complete (21) to the Customized MME 22. The UE 1 uses this TAU Complete (21) as an acknowledge response to the received signal TAU Accept (20).

The General MME 21 and the Customized MME 22 are equipped with a function of determining which MME needs to be connected to the UE 1. This function is the same as that in example 1.

In the present example, in the same manner as described above, when the eNodeB 11 receives a TA Update Request from the UE 1 that needs to be connected to the General MME 21 (for example, from a normal mobile station (a normal mobile station that is not compatible with a special service such as MTC or MBMS), by selecting the General MME, the UE 1 is connected to the General MME 21 and a service is provided from the General MME 21.

In the present example, the TA Update Procedure has been performed based on the sequence in FIG. 9. However, a feature in the present example is that the eNodeB 11 selects an MME. Thus, the present example can also be realized by, for example, other Procedures for re-establishing S1 Connection, such as a Service Request.

As described above, according to the present example, the General MME instructs the eNodeB to perform re-selection of an MME. In response to the instruction, the eNodeB specifies the Customized MME when selecting the next MME, and the Procedure is continued. In this way, the UE can be connected to an appropriate MME.

Exemplary Embodiment 2

As exemplary embodiment 2, a configuration with UMTS (Universal Mobile Telecommunications System) will be described. In this configuration, a UE transmits an Attach Request and the UE is connected to a Customized SGSN. FIG. 2 illustrates a system configuration according to exemplary embodiment 2.

A UE 101 is a terminal that receives a service from a Customized SGSN. For example, the UE 101 may be the above MTC device or MBMS-compatible terminal. In the case wherein the UE 101 is a normal mobile station that utilizes normal services such as a mobile phone terminal or a smartphone (a terminal that is not compatible with a specific service such as MTC or MBMS), the UE 101 is connected to a General SGSN. In addition, as will be described below, when the Customized SGSN is selected in response to an Attach Request from a normal mobile station (for example, from a terminal that is not compatible with a specific service such as MTC or MBMS), re-selection of an SGSN is performed. As a result, the UE 1 is connected to the General SGSN.

A NodeB 111 and an RNC (a radio network controller) 171 are devices for Radio access adopted for the UMTS system.

A General SGSN 121 and a Customized SGSN 122 are devices, each of which covers an area and is used in the UMTS. Depending on the connection mode, the General SGSN 121 and the Customized SGSN 122 handle the user plane. If the SGSNs do not handle the user plane, the user plane is set between an S-GW and an RNC.

An HLR (Home Location Register) 131 is a database storing subscriber information.

A GGSN 141 (Gateway GPRS (General Radio Packet Service) Support Node: which is described as "gateway GPRS support node" in the claims) is a gateway device connected to an external network. A service network 161 is an external network (data packet network).

Figure 2:
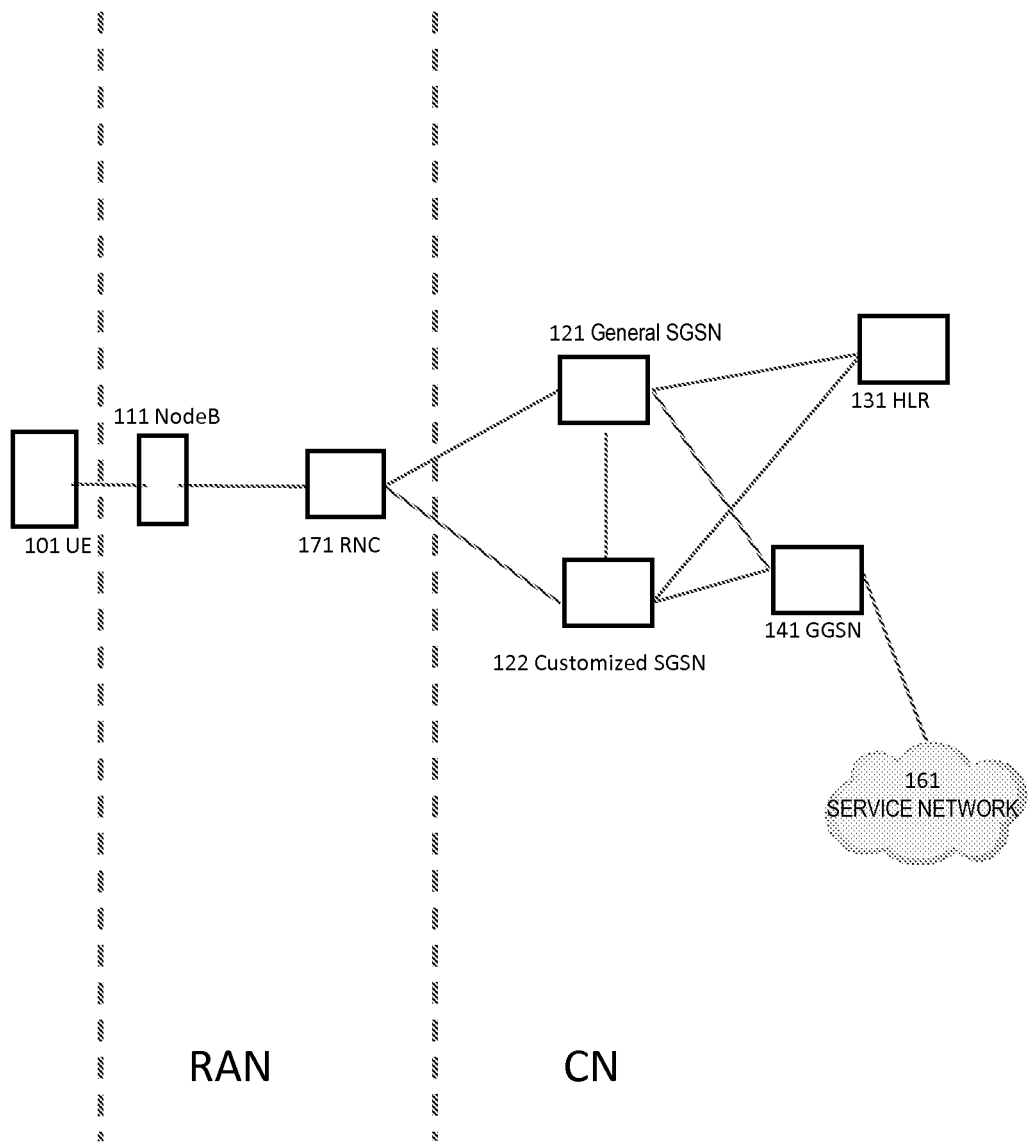
FIG. 2 is a diagram illustrating a system configuration according to a second exemplary embodiment of the present invention.

In FIG. 2, the NodeB 111 and the RNC 171 are devices in a radio access network RAN. The SGSN, the GGSN, and so forth are devices in a core network.

Next, exemplary embodiment 2 will be described based on several examples. Different control methods are described in the respective examples. The following examples 6 to 10 correspond to the above Modes 6 to 10, respectively.

Example 6

Figure 10:
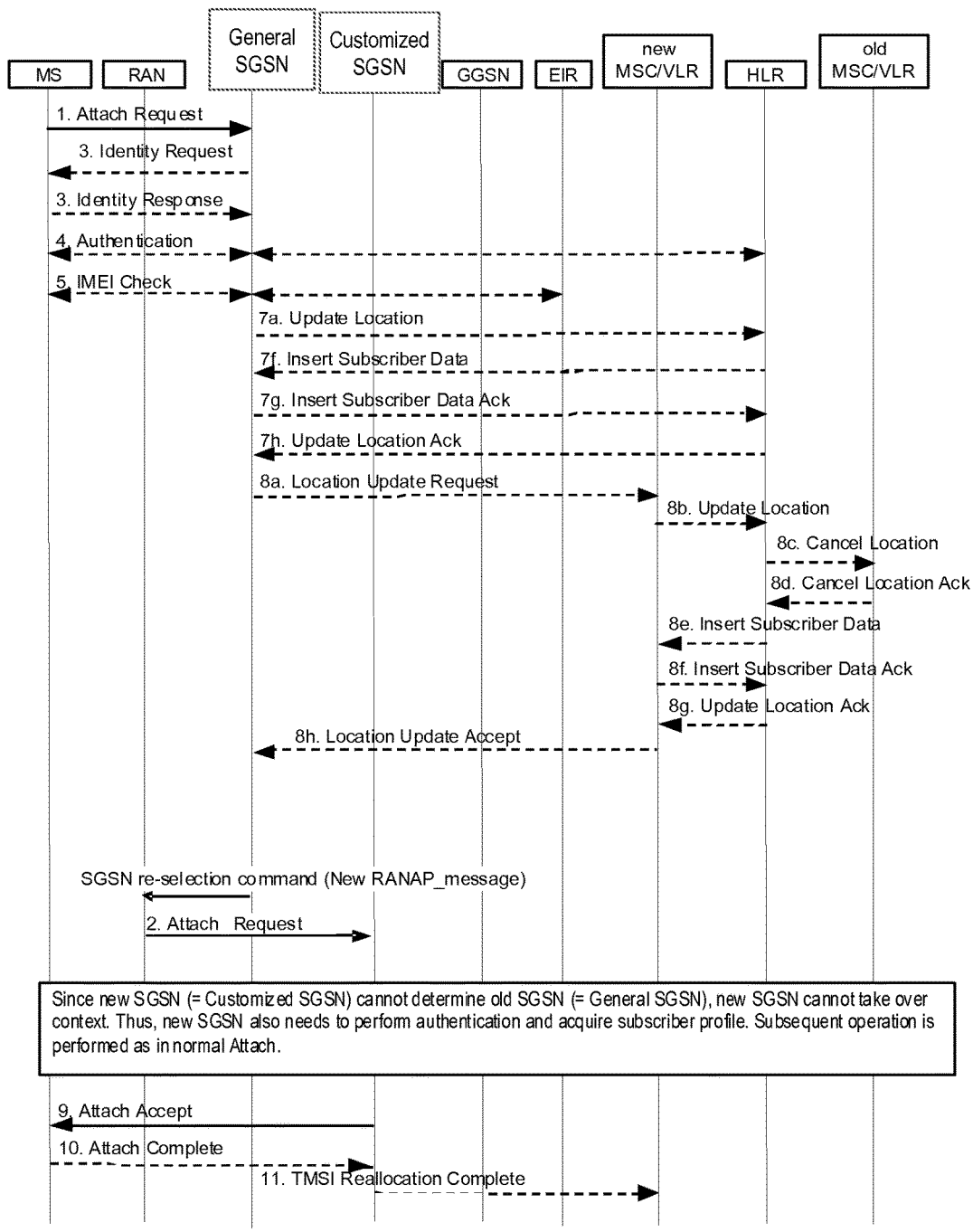
FIG. 10 is a diagram illustrating a sequence according to a sixth example of the present invention.

FIG. 10 is a sequence diagram illustrating an operation according to example 6 and is based on 3GPP TS 23.060 6.5 FIG. 22.

In FIG. 10,

"MS (Mobile Station)" corresponds to the UE 101 in FIG. 2,

"RAN (Radio Access Network)" corresponds to the NodeB 111 and the RNC 171 in FIG. 2, "General SGSN" corresponds to the General SGSN 121 in FIG. 2, "Customized SGSN" corresponds to Customized SGSN 122 in FIG. 2, "GGSN" corresponds to the GGSN 141 in FIG. 2, and "HLR" corresponds to the HLR 131 in FIG. 2.

A VLR of an MSC (Mobile Switching Center)/VLR (Visitor Location Register) is a location register for CS services other than the HLR. An EIR (Equipment Identifier Register) stores identifiers of valid mobile devices.

An operation will be described with reference to FIGS. 2 and 10. Hereinafter, the UE 101 in FIG. 2 will be used as the MS in FIG. 10.

When the UE 101 (MS) transmits an Attach Request (1), first, the NodeB 111 receives the Attach Request (1) and forwards the Attach Request (1) to the RNC 171. The RNC 171 forwards the Attach Request (1) to an SGSN. However, the RNC 171 cannot uniquely determine whether to forward the Attach Request to the General SGSN 121 or to the Customized SGSN 122. Thus, there are cases where the RNC 171 forwards the Attach Request to the General SGSN 121.

After receiving the Attach Request, the General SGSN 121 acquires terminal information via an Identity Request/Response (3, 4). In addition, the General SGSN 121 performs authentication and acquires a subscriber profile, in coordination with the HLR 131. Namely, in this case, the General SGSN 121 performs authentication and acquires a subscriber profile.

The General SGSN 121, on acquisition of the terminal information and the subscriber profile, determines whether to connect the UE 101 to the General SGSN 121 or to the Customized SGSN 122. In the case wherein the UE 101 needs to be connected to the General SGSN 121, the General SGSN 121 continues a normal Attach Procedure.

In the case wherein the UE 101 needs to be connected to the Customized SGSN 122, to instruct re-selection of an SGSN, the General SGSN 121 transmits an SGSN re-selection Command (an RANAP signal newly introduced in the present example) to the RNC 171. In this sequence, the General SGSN 121 sets an identifier identifying the Customized SGSN 122 in the SGSN re-selection Command signal (for example, an RAI (Routing Area Identifier) or an NRI (Network Resource Identifier)). Namely, the General SGSN 121 transmits, to the RNC 171, an SGSN re-selection request in which necessary information (RAI) for selecting the customized SGSN 122 is included. In the case of re-selection being performed within a single pool, only the NRI may be used. The SGSNs are equipped with a function of determining whether the UE 101 is a re-selection target.

When the RNC 171 receives the SGSN re-selection Command signal, in accordance with the identifier set in this signal, the RNC 171 selects the Customized SGSN 122 and forwards the Attach Request (1). Since the customized SGSN 122 needs an NAS (Non Access Stratum) parameter of the Attach Request, the RNC 171 transmits the Attach Request. The RNC 171 is equipped with a function of storing such NAS message.

Since the new SGSN (=the Customized SGSN) cannot determine the old SGSN (=the General SGSN), the new SGSN cannot take over context. Thus, the new SGSN also needs to perform authentication and acquire the subscriber profile. After receiving the Attach Request (2), the Customized SGSN 122 acquires terminal information via an Identity Request/Response. In addition, the Customized SGSN 122 performs authentication and acquires a subscriber profile, in coordination with the HLR 131. Namely, the Customized SGSN 122 performs the same processing as that performed by the General SGSN 121.

The Customized SGSN 122, on acquisition of the terminal information and the subscriber profile, determines whether to connect the UE 101 to the General SGSN 121 or to the Customized SGSN (022). In this case, since the Customized SGSN 122 has been selected after re-selection by the RNC 171, the Customized SGSN 122 continues a normal Attach Procedure, without transmitting an SGSN re-selection Command signal.

In addition, the General SGSN 121 and the Customized SGSN 122 are equipped with a function of determining which SGSN needs to be connected to the UE 101. This determination is made based on information transmitted from the UE 101. The information may be:

IMSI (International Mobile Subscriber Identity),
IMEI,
UE network capability,
MS network capability,
Mobile station classmark 2,
Mobile station classmark 3,
Device properties,
a new parameter of an Attach Request signal which will be added in the future, or
an identifier of a part of these parameters (for example, a PLMN-id included in the IMSI).

Alternatively, the above determination may be made based on information transmitted from the HLR 131. The information may be:

Feature-List,
APN,
a new parameter of an Update Location Answer/Insert Subscriber Data Request signal which will be added in the future, or
an identifier of a part of these parameters.

Any one of or a combination of these items of information may be used for the above determination.

In addition, in the present example, even when an Attach Request signal is forwarded from the UE 101 that needs to be connected to the General SGSN 121 to the Customized SGSN 122, the Customized SGSN 122 can request the RNC 171 to perform re-selection of an SGSN in a like manner. If the UE 101 is a normal mobile station (for example, a normal mobile station that is not compatible with a special service such as MTC or MBMS) and if the UE 101 is first connected to the Customized SGSN 122, the General SGSN 121 requests the RNC 171 to perform re-selection of an SGSN. As a result, the General SGSN 121 is selected and a service is provided from the General SGSN 121.

As described above, in the present example, an SGSN instructs the RNC to perform re-selection of an SGSN. In response to the instruction, the RNC performs re-selection of an SGSN and the Attach Procedure is continued. In this way, the UE can be attached to an appropriate SGSN.

Example 7

Figure 11:
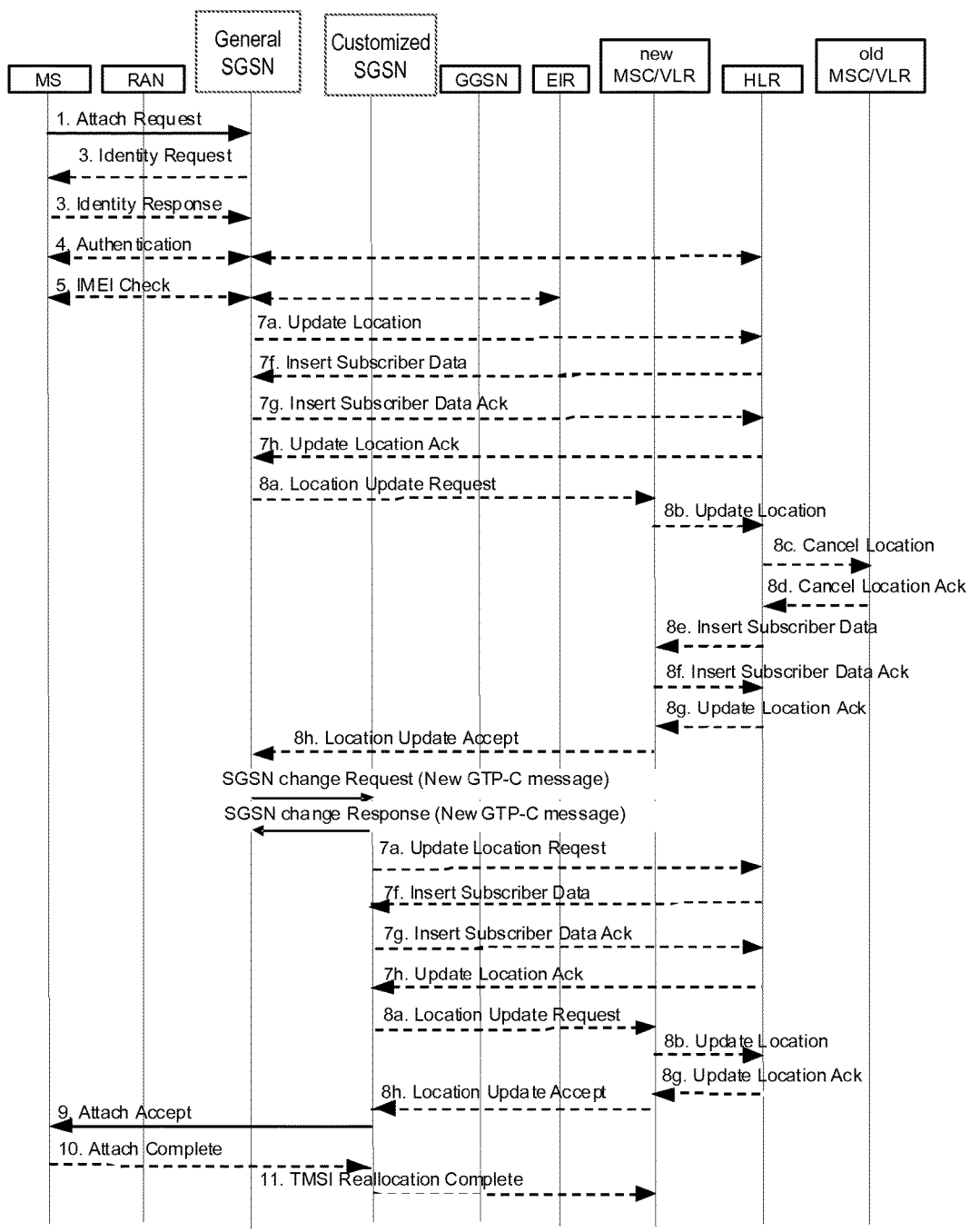
FIG. 11 is a diagram illustrating a sequence according to a seventh example of the present invention.

As example 7, another example with UMTS will be described. In this example, the UE transmits an Attach Request and the UE is connected to the Customized SGSN. In example 7, the same system configuration as that in example 6 will be used. FIG. 11 is a sequence diagram illustrating an operation according to example 7. Hereinafter, the operation will be described with reference to FIGS. 2 and 11.

When the UE 101 transmits an Attach Request (1), first, the NodeB 111 receives the Attach Request (1). Next, the NodeB 111 forwards the Attach Request to the RNC 171, and the RNC 171 forwards the Attach Request to an SGSN. However, the RNC 171 cannot uniquely determine whether to forward the Attach Request to the General SGSN 121 or to the Customized SGSN 122. Thus, there are cases where the RNC 171 forwards the Attach Request to the General SGSN 121.

The General SGSN 121, upon reception of the Attach Request, acquires terminal information via an Identity Request/Response. In addition, in coordination with the HLR 131, the General SGSN 121 performs authentication and acquires a subscriber profile. Namely, in this case, at least, the General SGSN 121 performs authentication and acquires a subscriber profile.

The General SGSN 121, upon acquisition of the terminal information and the subscriber profile, determines whether to connect the UE 101 to the General SGSN 121 or to the Customized SGSN 122. If the General SGSN 121 determines that the UE 101 needs to be connected to the General SGSN 121, the General SGSN 121 continues a normal Attach procedure.

In the case wherein the UE 101 needs to be connected to the Customized SGSN 122, in order to instruct change of an SGSN, the General SGSN 121 transmits an SGSN Change Request (a GTP signal newly introduced in the present exemplary embodiment) to the Customized SGSN 122.

In this sequence, the General SGSN 121 sets context information generated by authentication of the mobile station and acquisition of the subscriber profile in the SGSN Change Request signal. Namely, when the General SGSN 121 requests the Customized SGSN 122 for change of an SGSN (SGSN Change), the General SGSN 121 notifies a new SGSN (the Customized SGSN 122) of context. The SGSNs are equipped with a function of determining whether the UE 101 is a re-selection target.

The Customized SGSN 122, upon reception of the SGSN Change Request signal, holds the context information set in the SGSN Change Request signal and transmits an SGSN Change Response signal (a GTP signal newly introduced in the present exemplary embodiment) to the General SGSN 121.

Subsequently, the Customized SGSN 122 transmits an Update Location signal (8) to the HLR 131 to notify the HLR 131 of change of the SGSN.

When security context information transmitted from the General SGSN 121 is valid, the Customized SGSN 122 can omit performing re-authentication.

Subsequently, the Customized SGSN 122 continues the Attach Procedure and the RNC 171 receives an Attach Accept signal (9) from the Customized SGSN 122. Subsequently, a normal Attach Procedure is continued.

The General SGSN 121 and the Customized SGSN 122 are equipped with a function of determining which SGSN needs to be connected to the UE 101, as is the case with example 6.

In the present example, even when an Attach Request signal is forwarded from the UE 101 that needs to be connected to the General SGSN 121 to the Customized SGSN 122, the Customized SGSN 122 can request the General SGSN 121 for change of an SGSN in the same manner. In the case wherein the UE 101 is a normal mobile station (for example, a terminal that is not compatible with a special service such as MTC or MBMS) and if the UE 101 is connected to the Customized SGSN 122, the Customized SGSN 122 selects the General SGSN 121 and a service is provided from the General SGSN 121.

As described above, in the present example, the General SGSN instructs the Customized SGSN about change of an SGSN. In response to the instruction, the Customized SGSN accepts the change and continues the Attach Procedure. In this way, the UE can be attached to an appropriate SGSN.

Example 8

Figure 12:
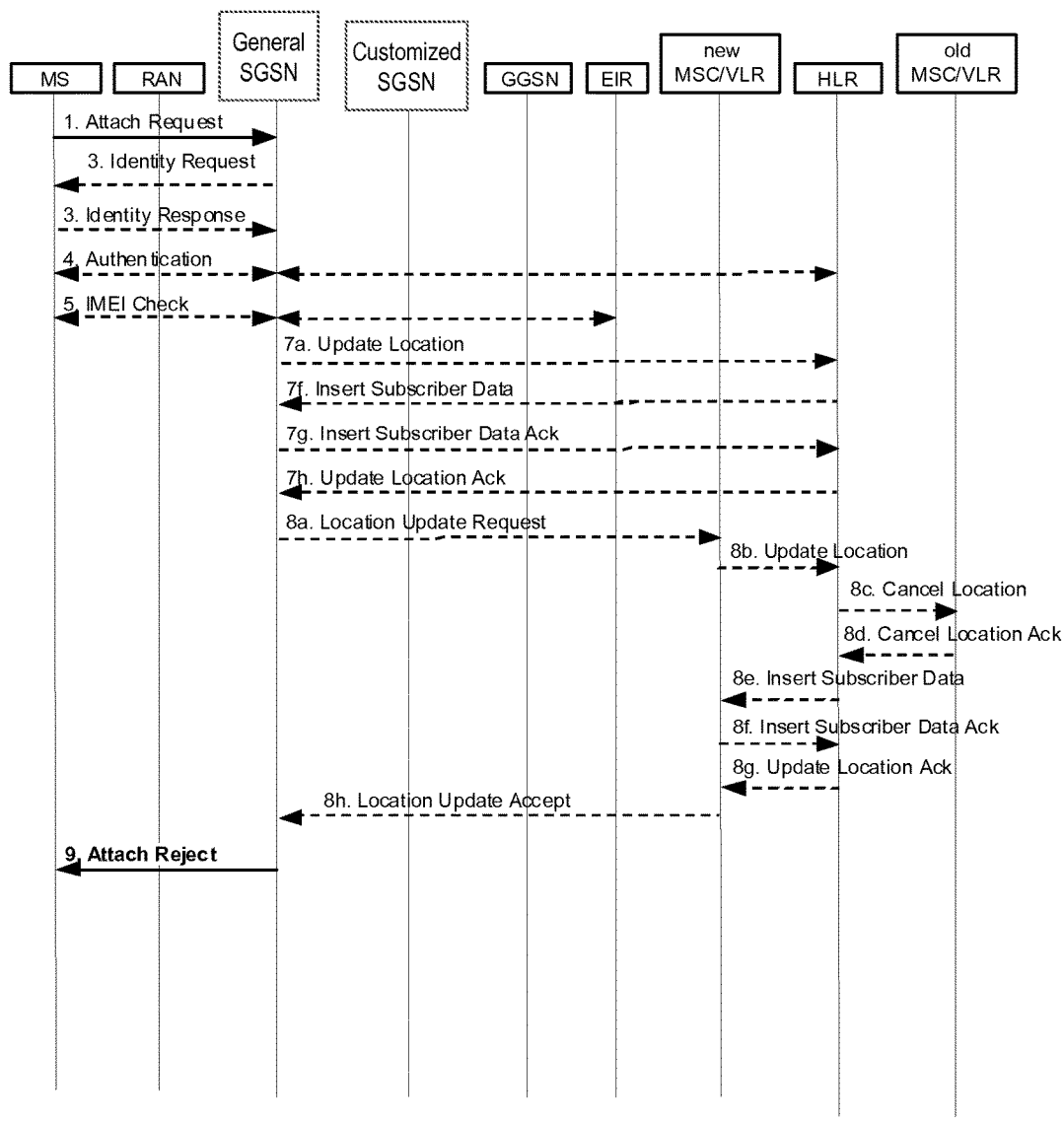
FIG. 12 is a diagram illustrating a sequence according to an eighth example of the present invention.
Figure 13:
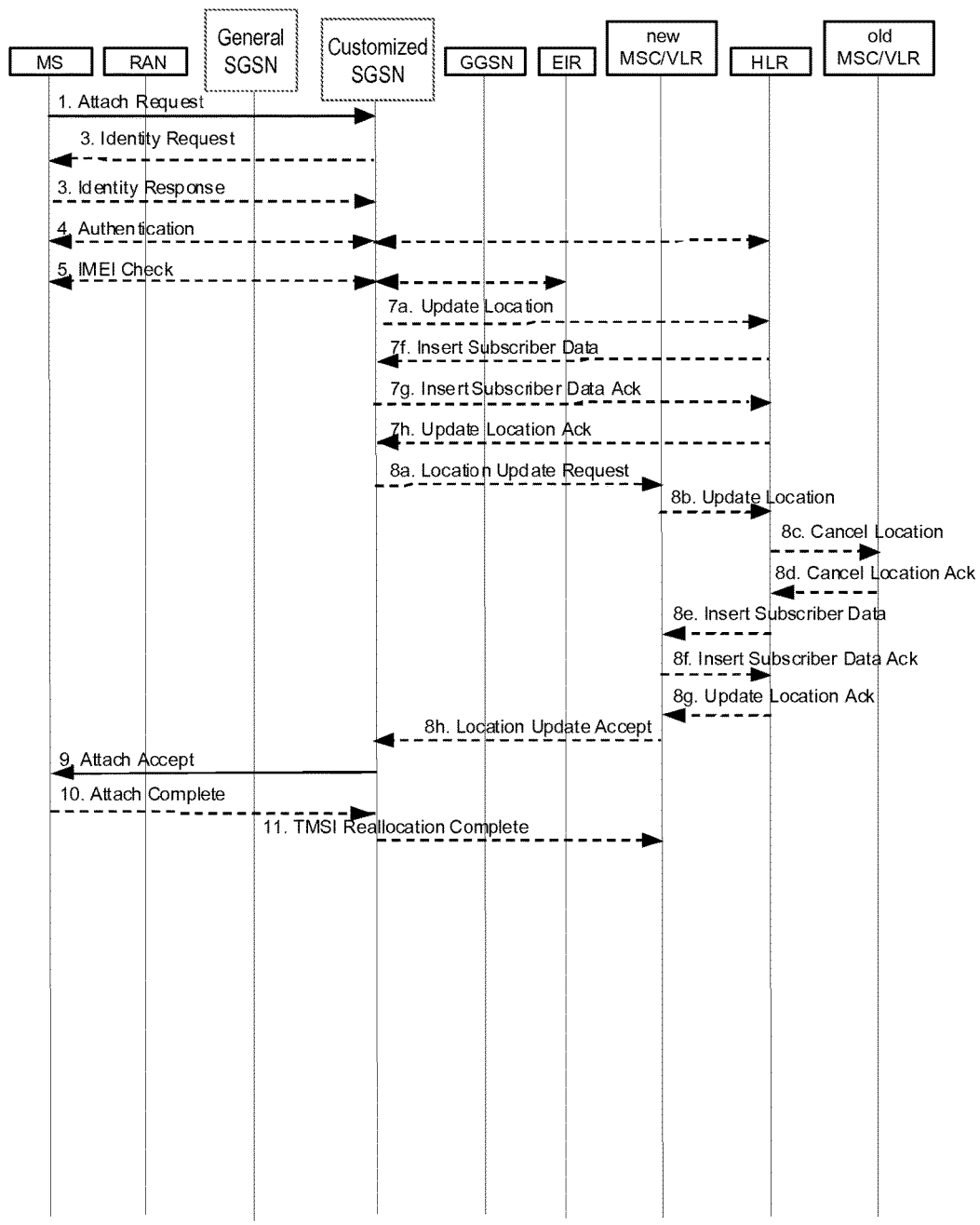
FIG. 13 is a diagram illustrating a sequence according to the eighth example of the present invention.

As example 8, another example with UMTS will be described. In this example, the UE transmits an Attach Request and the UE is connected to the Customized SGSN. In example 8, the same configuration as that in example 6 will be used. FIGS. 12 and 13 are sequence diagrams illustrating an operation according to example 8. Hereinafter, the operation will be described with reference to FIGS. 2, 12, and 13.

When the UE 101(MS) transmits an Attach Request (1), first, the NodeB 111 receives the Attach Request (1). Next, the NodeB 111 forwards the Attach Request to the RNC 171, and the RNC 171 forwards the Attach Request to an SGSN. However, the RNC 171 cannot uniquely determine whether to forward the Attach Request to the General SGSN 121 or to the Customized SGSN 122. Thus, there are cases where the RNC 171 forwards the Attach Request to the General SGSN 121.

After receiving the Attach Request (1), the General SGSN 121 acquires terminal information via an Identity Request/Response (3). In addition, in coordination with the HLR 131, the General SGSN 121 performs authentication and acquires a subscriber profile.

The General SGSN 121, on acquisition of the terminal information and the subscriber profile, determines whether to connect the UE 101 to the General SGSN 121 or to the Customized SGSN 122. In the case wherein the UE 101 needs to be connected to the General SGSN 121, the General SGSN 121 continues a normal Attach Procedure.

In the case wherein the UE 101 needs to be connected to the Customized SGSN 122, the General SGSN 121 transmits an Attach Reject signal (9) to the UE 101, instead of continuing the Attach Procedure.

In this case, the General SGSN 121 sets a parameter for instructing re-Attach and an RAI (Routing Area Identity) parameter (a parameter newly introduced in the present exemplary embodiment) in the Attach Reject signal, so that the RNC 171 can select the Customized SGSN 122 when performing re-Attach. While these parameters are parameters that are newly introduced in the present example, since the RNC 171 is transparent, the RNC 171 is not affected.

The UE 101 needs to are equipped with a function of receiving an RAI via an Attach Reject and using the RAI specified in the Attach Reject when transmitting a Re-Attach. The SGSNs are equipped with a function of determining whether the UE 101 is a re-selection target.

The UE 101, upon reception of the Attach Reject signal (9), transmits, to the RNC 171, the Attach Request signal (1) in which the RAI has been set, in accordance with the parameter for instructing re-Attach set in the Attach-Reject signal (9) and the RAI parameter (re-Attach by a P-TMSI (Packet Temporary Mobile Subscriber Identifier)), as illustrated in FIG. 13. The RNC 171 decides an appropriate SGSN from the RAI and forwards the Attach Request to the Customized SGSN 122.

Subsequently, the Customized SGSN 122 continues a normal Attach Procedure.

While the RAI is set in the Attach Request, the Customized SGSN 122 does not hold context information. Thus, upon reception of the Attach Request signal (1), the Customized SGSN 122 acquires terminal information via an Identity Request/Response (3). In addition, the Customized SGSN 122 performs authentication and acquires a subscriber profile in coordination with the HLR 131.

The General SGSN 121 and the Customized SGSN 122 are equipped with a function of determining which SGSN needs to be connected to the UE 101, as is the case with example 6.

In the present example, even when an Attach Request signal is forwarded from the UE 101 that needs to be connected to the General SGSN (121) to the Customized SGSN 122, the Customized SGSN 122 can request the UE 101 for re-selection of an SGSN in a like manner. If the UE 101 is a normal mobile station (for example, a terminal that is not compatible with a special service such as MTC or MBMS) and if the UE 101 is connected to the Customized SGSN 122, the Customized SGSN 122 transmits an Attach Reject signal to the UE 101 and requests the UE 101 to select the General SGSN 121. In this way, since the UE 101 transmits a re-Attach Request (Attach Request) signal, the General SGSN 121 is selected and a service is provided from the General SGSN 121.

As described above, in the present example, the General SGSN instructs the UE to perform re-selection of an SGSN. In response to the instruction, the UE specifies the Customized SGSN and an Attach Procedure is continued. In this way, the UE can be attached to an appropriate SGSN.

Example 9

Figure 14:
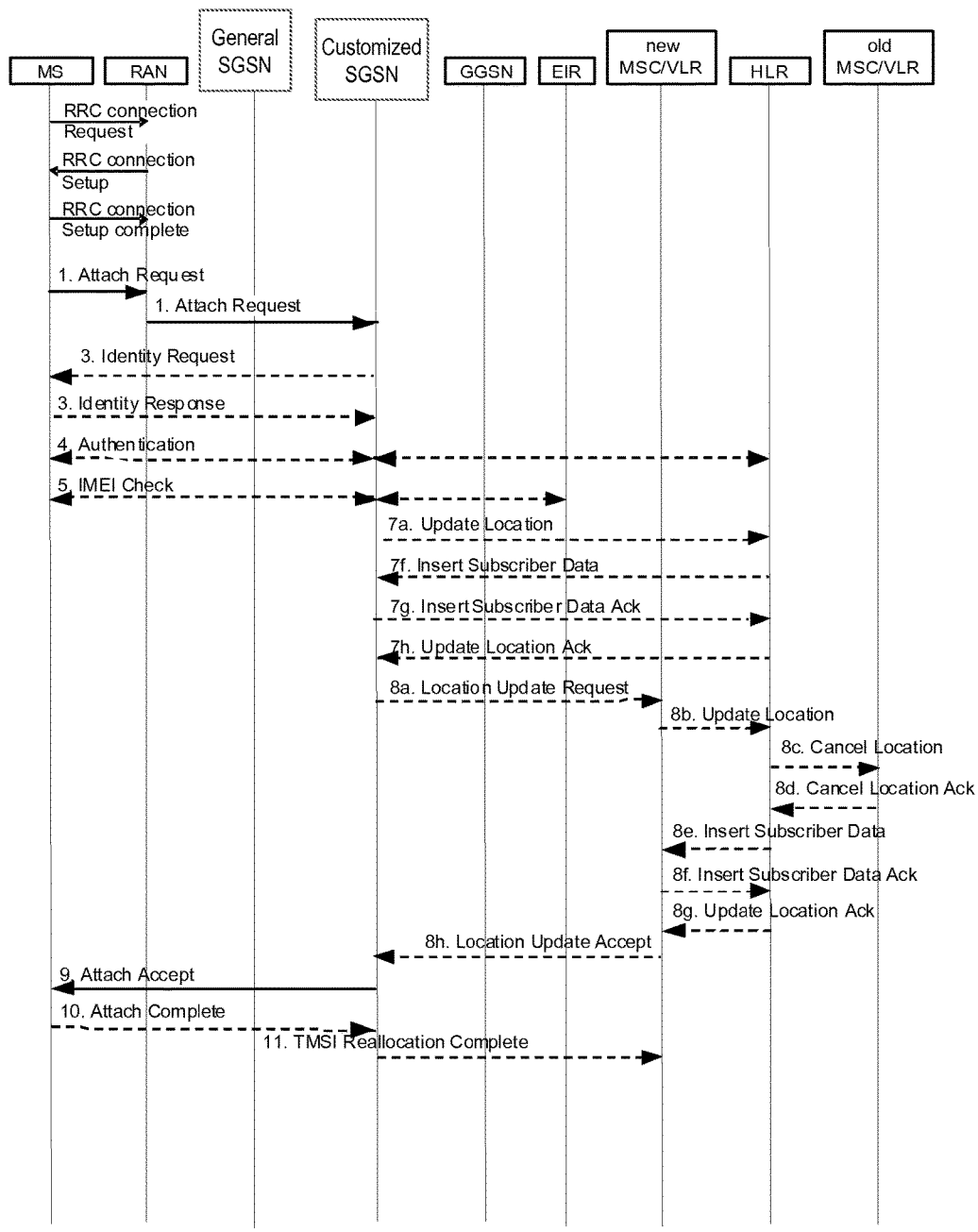
FIG. 14 is a diagram illustrating a sequence according to a ninth example of the present invention.

As example 9, another example with UMTS will be described. In this example, the UE transmits an Attach Request and the UE is connected to the Customized SGSN. In example 6, the same system configuration as that in example 6 will be used. FIG. 14 is a sequence diagram illustrating an operation according to example 9. Hereinafter, the operation will be described with reference to FIGS. 2 and 14.

To transmit an Attach Request to an SGSN, first, the UE 101 establishes RRC Connection with the RNC 171. To establish RRC Connection, first, the UE 101 transmits an RRC Connection Request signal to the RNC 171.

In this signal, the UE 101 sets a parameter indicating that the UE 101 needs to be connected to the Customized SGSN 122 (a User Identity, a new Value or a new parameter of establishment Cause (a value or a parameter newly introduced in the present example), or an identifier of a part of such parameters (a PLMN-id included in the IMSI, for example)).

When receiving the RRC Connection Request signal, the RNC 171 stores information indicating that the UE 101 needs to be connected to the Customized SGSN 122 and continues the subsequent RRC Connection Procedure.

After establishing RRC Connection, the UE 101 transmits an Attach Request (1) and the NodeB 111 receives the Attach Request (1). Next, the NodeB 111 forwards the Attach Request to the RNC 171.

The RNC 171 forwards the Attach Request to an SGSN. From the information stored when the RNC 171 has received the RRC Connection Request signal, the RNC 171 forwards the Attach Request signal to the Customized SGSN 122.

After receiving the Attach Request signal, the Customized SGSN 122 continues a normal Attach Procedure.

In addition, the UE 101 is equipped with a function of instructing the RNC 171 about which one of the General SGSN 121 and the Customized SGSN 122 needs to be connected to the UE 101. The UE 101 cannot store information about all the SGSNs in the core network, information indicating an SGSN type, a service type, or the like is used for the instruction given to the RNC 171, instead of an identifier by which a unique SGSN can be selected.

The RNC 171 is equipped with a function of determining which SGSN needs to be connected to the UE 101. For this determination, as described above, one of or a combination of a User Identity, a new value or a new parameter of Establishment Cause (a value or a parameter newly introduced in the present example), and an identifier of a part of such parameters is used.

As described above, in the present example, the UE 101 instructs the RNC 171 to select an SGSN. In response to the instruction, the RNC 171 specifies the Customized SGSN and an Attach Procedure is continued. In this way, the UE 101 can be attached to an appropriate SGSN.

Example 10

Figure 15:
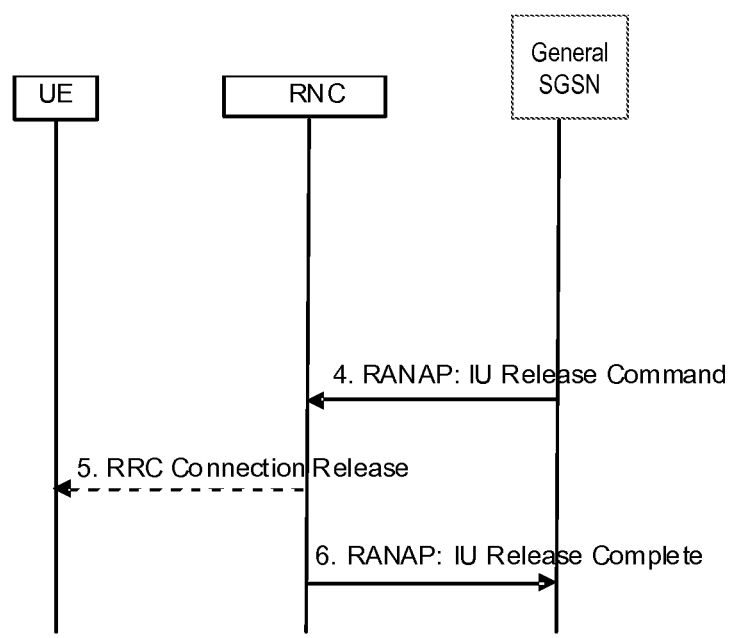
FIG. 15 is a diagram illustrating a sequence according to a tenth example of the present invention.
Figure 16:
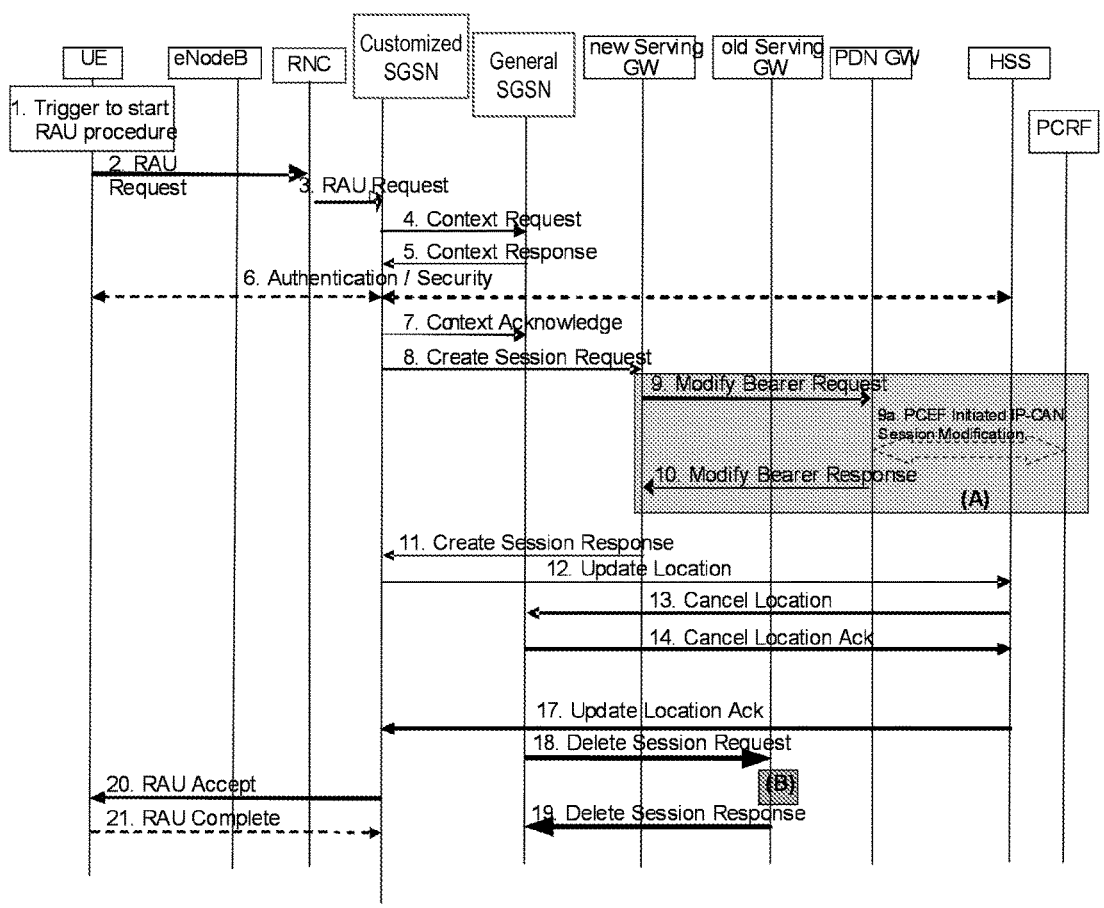
FIG. 16 is a diagram illustrating a sequence according to the tenth example of the present invention.

As example 10, another example with UMTS will be described. In this example, the UE and the Customized SGSN are connected when RA Update is performed. In example 10, the same system configuration as that in example 6 will be used. FIGS. 15 and 16 are sequence diagrams illustrating an operation according to example 10. Hereinafter, the operation will be described with reference to FIGS. 2, 15, 16, and a part of FIG. 10.

When the UE 101 transmits an Attach Request (see 1 in FIG. 10), first, the NodeB 111 receives the Attach Request. The NodeB 111 forwards the Attach Request to the RNC 171, and the RNC 171 forwards the Attach Request to an SGSN. The RNC 171 cannot uniquely determine whether to forward the Attach Request to the General SGSN 121 or to the Customized SGSN (12). Thus, there are cases where the RNC 171 forwards the Attach Request to the General SGSN 121.

After receiving the Attach Request, the General SGSN 121 acquires terminal information via an Identity Request/Response (see 3, in FIG. 10). In addition, the General SGSN 121 performs authentication and acquires a subscriber profile in coordination with the HLR 131.

The General SGSN 121, on acquisition of the terminal information and the subscriber profile, determines whether to connect the UE 101 to the General SGSN 121 or to the Customized SGSN 122. In the case wherein the UE 101 needs to be connected to the General SGSN 121, the General SGSN 121 continues a normal Attach Procedure.

In the case wherein the UE 101 needs to be connected to the Customized SGSN 122, the General SGSN 121 performs Iu Release to cause the UE 101 to perform RA (Routing Area) update, as illustrated in FIG. 15.

The General SGSN 121 transmits an Iu Release Command signal (4 in FIG. 15) to the RNC 171. The General SGSN 121 gives an instruction about an SGSN to be selected by the RNC when establishing Iu Connection with an SGSN next time, by using an SGSN identifier (for example, an RAI or an NRI) in the Iu Release Command signal. In the case of a single pool, the NRI may be used.

Even after Iu Release is completed, while the RNC 171 is holding session information for the UE 101, the RNC 171 continues to hold the SGSN identifier as information for selection of the next SGSN.

After Iu Release is performed (after the RNC 171 transmits IU Release Complete (6) to the General SGSN 121), next, as illustrated in FIG. 16, the UE 101 transmits an RAU request (RA Update Request) (2).

First, the NodeB 111 receives the RAU Request (2), and the NodeB 111 forwards the RAU Request (3) to the RNC 171.

Next, the RNC 171 forwards the RAU request to an SGSN. Since Iu Release (c) has already been performed, the RNC 171 performs selection of an SGSN and establishes Iu Connection.

In selection of an SGSN, the RNC 171 selects the Customized SGSN 122 in accordance with the SGSN Identifier specified in the Iu Release Command signal received from the General SGSN 121. The RNC selects the Customized SGSN in accordance with the RAI (or the NRI) instructed by the old SGSN (=the General SGSN) when Iu Release is performed. The RNC is equipped with a function of holding the next RAI per UE.

After receiving the RAU request, the Customized SGSN 122 continues a normal RA Update Procedure. Since the P-TMSI (RAI) on the NAS indicates the General SGSN, which is the old SGSN, the Customized SGSN 122 acquires context.

The General SGSN 121 and the Customized SGSN 122 are equipped with a function of determining which SGSN needs to be connected to the UE 101. This function is the same as that in example 6.

In the present example, in the same means as described above, when the RNC 17 receives an RA Update Request from the UE 101 that needs to be connected to the General SGSN 121 (for example, from a normal mobile station (a normal mobile station that is not compatible with a special service such as MTC or MBMS)), by selecting the General SGSN 121, the UE 101 is connected to the General SGSN 121 and a service is provided from the General SGSN 121.

In addition, in the present example, the RA Update Procedure has been performed based on the sequence in FIG. 16. However, a feature in the present example is that the RNC 171 selects an SGSN. Thus, the present example can also be realized by, for example, other procedures for re-establishing Iu Connection, such as PDP Context Activation.

As described above, according to the present example, the General SGSN instructs the RNC to perform re-selection of an SGSN. In response to the instruction, the RNC specifies the Customized SGSN in the next selection of an SGSN, and the other procedure is continued. In this way, the UE can be connected to an appropriate SGSN.

Hereinafter, differences among the above examples will be described.

<Mobile Network>

Examples 1-5 are, for example, based on LTE (Long Term Evolution) (the radio access network is E-UTRAN (Evolved-Universal Terrestrial Radio Access Network) and the core network is EPC). Examples 6-10 are, for example, based on 3G (3rd Generation) (the radio access network is UTRAN (Universal Terrestrial Radio Access Network) and the core network is GPSR).

<Implementation Methods>

A) Examples 1 and 6: attach procedure (retry in the RAN (Radio Access Network))
B) Examples 2 and 7: attach procedure (interworking in the core network (CN))
C) Examples 3 and 7: retry by the terminal
D) Examples 4 and 8: selection in the core network (CN)
E) Examples 5 and 10: update of the location management area (RAU/TAU)

<Extent of the Impact (Elements that Need to be Modified for Implementation)>

A) Examples 1 and 6: the RAN (radio access network) and the CN (core network)
B) Examples 2 and 7: the CN (RAN)
C) Examples 3 and 8: the terminal and the CN
D) Examples 4 and 9: the terminal and the RAN
E) Examples 5 and 10: the RAN and the CN <Advantageous Effects, Etc. Provided by Implementation>

A) Examples 1 and 6: while no functions need to be added to the terminal, functions need to be added to the RAN.
B) Examples 2 and 7: no functions need to be added to the terminal, and in some cases, no functions need to be added to the RAN. In addition, among the examples, the least signal amount is required.
C) Examples 3 and 8: no functions need to be added to the RAN, and functions can easily be added to the terminal and the CN. However, Attach Reject requires time.
D) Examples 4 and 9: while no functions need to be added to the CN, more functions need to be added to the RAN than the other examples. In addition, the RAN needs to store and manage a CN list for selecting a CN. Before accessing the HLR/HSS, information used for selecting a CN is limited.
E) Examples 5 and 10: no functions need to be added to the terminal. Re-selection of a CN is possible after Attach by change of a contract or the like.

<Cases where Core Network Node is Selected>

Hereinafter, several cases where a core network node is selected based on the above exemplary embodiments and examples will be described.

An MTC (Machine Type Communication) device (an M2M device) is connected to a customized CN node (a node optimized for MTC devices).

A user using MBMS is connected to a customized CN node (an MBMS-compatible CN node).

In another case, a service is provided only by a customized CN node so that a new service is started in a small scale.

<Cases with LTE>

A specific UE is connected to a node in which an MME and an SGW are collocated. While not particularly limited, for example, there are cases where a small amount of data traffic is transmitted to a UE via an SMS (Short Message Service). In such cases, if an MME and an SGW are collocated, implementation of SMS conversion processing can be achieved more easily.

In addition, MMEs are switched, depending on a terminal type (CSFB (CS Fallback) terminal and a VoLTE terminal, for example). CSFB (CS Fallback) is a function of switching radio to 3G (or 2G) when a CS (Circuit Switched) service is transmitted or received during LTE connection. VoLTE (Voice over LTE) is a function of providing a voice (which have been provided via CS) service on LTE. The CSFB terminal needs to interwork with an MSC. The VoLTE terminal needs to interwork with an IMS (IP Multimedia Subsystem). When CSFB is performed, an MSC (Mobile Switching Center) that is in advance attached is caused to select a collocated MME.

The disclosure of the above Patent Literature incorporated herein by reference thereto. Modifications and adjustments of the exemplary embodiments and examples are possible within the scope of the overall disclosure (including the claims) of the present invention and based on the basic technical concept of the present invention. Various combinations and selections of various disclosed elements (including the elements in each of the claims, examples, drawings, etc.) are possible within the scope of the claims of the present invention. That is, the present invention of course includes various variations and modifications that could be made by those skilled in the art according to the overall disclosure including the claims and the technical concept.

At least part of the above-disclosed exemplary embodiments and examples can be described as the following Supplementary Notes, though not limited thereto.

(Supplementary Note 1)

A communication system including a core network for a mobile communication system, wherein the core network comprises a plurality of nodes, each node serving as a node to manage mobility of a terminal, the plurality of nodes being different to each other with regard to service functions that the nodes provide to a terminal, and wherein based on subscriber information and terminal information, a node to be connected to the terminal is selected from among the plurality of nodes, depending on a service characteristic utilized by the terminal or on a type of the terminal, and the terminal is connected to the selected node.

(Supplementary Note 2)

The communication system according to Supplementary Note 1, wherein a first mobility management entity node, upon reception of an Attach Request from the terminal via a base station apparatus, transmits a mobility management entity re-selection request signal to the base station apparatus, in order to connect the terminal to a second mobility management entity node that provides a service different from a service provided by the first mobility management entity node, and wherein the base station apparatus transmits an Attach Request to the second mobility management entity node to connect the terminal to the second mobility management entity node.

(Supplementary Note 3)

The communication system according to Supplementary Note 1, wherein a first mobility management entity node, upon reception of an Attach Request from the terminal via a base station apparatus, transmits a mobility management entity change request signal to a second mobility management entity node that provides a service different from a service provided by the first mobility management entity node, in order to connect the terminal to the second mobility management entity node, and wherein the second mobility management entity node continues an Attach procedure for the Attach Request to connect the terminal to the second mobility management entity node.

(Supplementary Note 4)

The communication system according to Supplementary Note 1, wherein a first mobility management entity node, upon reception of an Attach Request from the terminal via a base station apparatus, transmits an Attach Reject, to which an identifier of a second mobility management entity node that provides a service different from a service provided by the first mobility management entity node is added, to the terminal, in order to connect the terminal to the second mobility management entity node, and wherein the terminal adds the identifier of the second mobility management entity node to an Attach Request and re-transmit the Attach Request to connect to the second mobility management entity node.

(Supplementary Note 5)

The communication system according to Supplementary Note 1, wherein the terminal transmits an RRC Connection Request, to which is added connection request information requesting connection to a second mobility management entity node that provides a service different from a service provided by a first mobility management entity node, to a base station apparatus, and wherein at a time when the base station apparatus, upon reception of the RRC Connection Request, transmits an Attach Request received from the terminal with RRC connection to a mobility management entity being established, the base station apparatus selects the second mobility management entity node to connect the terminal to the second mobility management entity node.

(Supplementary Note 6)

The communication system according to Supplementary Note 1, wherein, when a first mobility management entity node with a session with the terminal being established releases connection established between the base station apparatus and the first mobility management entity node, the first mobility management entity node instructs the base station apparatus to select a second mobility management entity node that provides a service different from a service provided by the first mobility management entity node in next selection of a mobility management entity by the base station apparatus, and wherein upon transmission of a location management area update request by the terminal to the base station apparatus, the base station apparatus selects the second mobility management entity node to connect the terminal to the second mobility management entity node.

(Supplementary Note 7)

The communication system according to Supplementary Note 1, wherein a first serving GPRS (General Packet Radio Service) support node, upon reception of an Attach Request from the terminal via a radio network controller, transmits a serving GPRS support node re-selection request signal to the radio network controller, in order to connect the terminal to a second serving GPRS support node that provides a service different from a service provided by the first serving GPRS support node, and wherein the radio network controller re-transmits an Attach Request to the second serving GPRS support node to connect the terminal to the second serving GPRS support node.

(Supplementary Note 8)

The communication system according to Supplementary Note 1, wherein a first serving GPRS (General Packet Radio Service) support node (SGSN), upon reception of an Attach Request from the terminal via a radio network controller, transmits a serving GPRS support node change request signal to a second serving GPRS support node that provides a service different from a service provided by the first serving GPRS support node, in order to connect the terminal to the second serving GPRS support node, and wherein the second serving GPRS support node continues an Attach procedure for the Attach Request to connect the terminal to the second serving GPRS support node.

(Supplementary Note 9)

The communication system according to Supplementary Note 1, wherein a first serving GPRS (General Packet Radio Service) support node (SGSN), upon reception of an Attach Request from the terminal via a radio network controller, transmits an Attach Reject, to which is added an identifier of a second serving GPRS support node that provides a service different from a service provided by the first serving GPRS support node is added, to the terminal to connect the terminal to the second serving GPRS support node, and wherein the terminal adds the identifier of the second serving GPRS support node to an Attach Request and re-transmits the Attach Request to connect to the second serving GPRS support node.

(Supplementary Note 10)

The communication system according to Supplementary Note 1, wherein the terminal transmits an RRC (Radio Resource Control) Connection Request, to which is added connection request information requesting connection to a second serving GPRS support node that provides a service different from a service provided by a first serving GPRS (General Packet Radio Service) support node, to a radio network controller, and wherein at a time when the radio network controller, upon reception of the RRC connection Request, transmits an Attach Request from the terminal with RRC connection to a serving GPRS support node being established, the radio network controller selects the second serving GPRS support node to connect the terminal to the second serving GPRS support node.

(Supplementary Note 11)

The communication system according to Supplementary Note 1, wherein, when a first serving GPRS (General Packet Radio Service) support node with a session with the terminal being established releases connection established between the first serving GPRS (General Packet Radio Service) support node and the radio network controller, the first serving GPRS support node instructs the radio network controller to select a second serving GPRS support node that provides a service different from a service provided by the first serving GPRS support node in next selection of a serving GPRS support node by the radio network controller, and wherein upon transmission of a location management area update request by the terminal to the radio network controller, the radio network controller selects the second serving GPRS support node to connect the terminal to the second serving GPRS support node.

(Supplementary Note 12)

A communication method, comprising:

arranging a plurality of nodes for the terminal in a mobile communication system core network, the nodes serving as nodes for managing mobility of a terminal, and being different to each other with regard to service functions that the nodes provide to a terminal;

selecting, based on subscriber information and terminal information, a node to be connected to the terminal from among the plurality of nodes, depending on characteristics of a service used by the terminal or on a type of the terminal; and connecting the terminal to the selected node.

(Supplementary Note 13)

The communication method according to Supplementary Note 12, comprising:

a first mobility management entity node, upon reception of an Attach Request from the terminal via a base station apparatus, transmitting a mobility management entity re-selection request signal to the base station apparatus, in order to connect the terminal to a second mobility management entity node that provides a service different from a service provided by the first mobility management entity node; and the base station apparatus transmitting an Attach Request to the second mobility management entity node to connect the terminal to the second mobility management entity node.

(Supplementary Note 14)

The communication method according to Supplementary Note 12, comprising:

a first mobility management entity node, upon reception of an Attach Request from the terminal via a base station apparatus, transmitting a mobility management entity change request signal to a second mobility management entity node that provides a service different from a service provided by the first mobility management entity node, in order to connect the terminal to the second mobility management entity node; and the second mobility management entity node continuing a procedure for the Attach Request to connect the terminal to the second mobility management entity node.

(Supplementary Note 15)

The communication method according to Supplementary Note 12, comprising:

a first mobility management entity node, upon reception of an Attach Request from the terminal via a base station apparatus, transmitting an Attach Reject, to which is added an identifier of a second mobility management entity node that provides a service different from a service provided by the first mobility management entity node, to the terminal, in order to connect the terminal to the second mobility management entity node; and the terminal adding the identifier of the second mobility management entity node to an Attach Request and re-transmitting the Attach Request to connect to the second mobility management entity node.

(Supplementary Note 16)

The communication method according to Supplementary Note 12, comprising:

the terminal transmitting an RRC (Radio Resource Control) Connection Request, to which is added connection request information requesting connection to a second mobility management entity node that provides a service different from a service provided by a first mobility management entity node, to a base station apparatus; and the base station apparatus selecting the second mobility management entity node, at a time when the base station apparatus, upon reception of the RRC Connection Request, transmits an Attach Request from the terminal with RRC connection to a mobility management entity being established, to connect the terminal to the second mobility management entity node.

(Supplementary Note 17)

The communication method according to Supplementary Note 12, comprising:

when a first mobility management entity node with a session with the terminal being established releases connection established between the base station apparatus and the first mobility management entity node, the first mobility management entity node instructing the base station apparatus to select a second mobility management entity node that provides a service different from a service provided by the first mobility management entity node in next selection of a mobility management entity by the base station apparatus; and upon transmission of a location management area update request by the terminal to the base station apparatus, the base station apparatus selecting the second mobility management entity node to connect the terminal to the second mobility management entity node.

(Supplementary Note 18)

The communication method according to Supplementary Note 12, comprising:

a first serving GPRS (General Packet Radio Service) support node (SGSN), upon reception of an Attach Request from the terminal via a radio network controller, transmitting a serving GPRS support node re-selection request signal to the radio network controller, in order to connect the terminal to a second serving GPRS support node that provides a service different from a service provided by the first serving GPRS support node; and the radio network controller transmitting an Attach Request to the second serving GPRS support node to connect the terminal to the second serving GPRS support node.

(Supplementary Note 19)

The communication method according to Supplementary Note 12, comprising:

a first serving GPRS (General Packet Radio Service) support node (SGSN), upon reception of an Attach Request from the terminal via a radio network controller, transmitting a serving GPRS support node change request signal to a second serving GPRS support node that provides a service different from a service provided by the first serving GPRS support node, in order to connect the terminal to the second serving GPRS support node; and the second serving GPRS support node continuing an Attach procedure to connect the terminal to the second serving GPRS support node.

(Supplementary Note 20)

The communication method according to Supplementary Note 12, comprising:

a first serving GPRS (General Packet Radio Service) support node (SGSN), upon reception of an Attach Request from the terminal via a radio network controller, transmitting an Attach Reject, to which is added an identifier of a second serving GPRS support node that provides a service different from a service provided by the first serving GPRS support node, to the terminal, in order to connect the terminal to the second serving GPRS support node; and the terminal adding the identifier of the second serving GPRS support node to an Attach Request and re-transmitting the Attach Request to connect to the second serving GPRS support node.

(Supplementary Note 21)

The communication method according to Supplementary Note 12, comprising:

the terminal transmitting an RRC (Radio Resource Control) Connection Request, to which is added connection request information requesting connection to a second serving GPRS support node that provides a service different from a service provided by a first serving GPRS support node, to a radio network controller; and at a time when the radio network controller, upon reception of the RRC Connection Request, transmits an Attach Request from the terminal with RRC connection to a serving GPRS support node (SGSN) being established, the radio network controller selecting the second serving GPRS support node to connect the terminal to the second serving GPRS support node.

(Supplementary Note 22)

The communication method according to Supplementary Note 12, comprising:

when a first serving GPRS (General Packet Radio Service) support node with a session with the terminal being established releases connection established between the first serving GPRS (General Packet Radio Service) support node and the radio network controller, the first serving GPRS support node instructing the radio network controller to select a second serving GPRS support node that provides a service different from a service provided by the first serving GPRS support node, in next selection of a serving GPRS support node by the radio network controller; and upon transmission of a Routing Area Update Request by the terminal to the radio network controller, the radio network controller selecting the second serving GPRS support node to connect the terminal to the second serving GPRS support node.

(Supplementary Note 23)

A node apparatus that performs control to select, as a mobility management node apparatus to manage mobility of a terminal, another mobility management node apparatus compatible with a service characteristic utilized by the terminal or a type of the terminal, based on subscriber information and terminal information to connect the terminal to the selected another mobility management node apparatus.

(Supplementary Note 24)

The node apparatus according to Supplementary Note 23, wherein the node apparatus is a node apparatus on a radio access network or a core network in a mobile communication system.

(Supplementary Note 25)

A communication system, comprising:

a general MME (Mobility Management Entity) or a general SGSN (Serving GPRS Support Node) for a general terminal other than a predetermined specific terminal, as a core network node managing mobility of a terminal; and a customized MME or a customized SGSN that includes a function to provide a predetermined specific service to the specific terminal or that is customized to be compatible with the specific terminal of a predetermined type, wherein the general MME, the general SGSN, or the specific terminal selects the customized MME or the customized SGSN as a node to which the specific terminal is connected.

The invention claimed is:

1. A terminal, comprising:
a transmitter configured to transmit an Attach Request to a network node, wherein
the network node is configured to transmit to a radio access device a request signal including an identifier corresponding to a dedicated network node that is dedicated to serve a specific terminal, wherein the request signal is based on subscriber information obtained from a subscriber information management apparatus, and
the radio access device is configured to re-select the dedicated network node based on the identifier, thereby connecting, by the specific terminal, to the dedicated network node re-selected.

2. The terminal according to claim 1, wherein
the transmitter is configured to transmit identity information including terminal information after transmitting the Attach Request,
the identity information is used, by the network node, for transmitting to the radio access device the request signal, and
the identity information is used, by the radio access device, for re-selecting the dedicated network node.

3. The terminal according to claim 1, wherein
the radio access device includes a base station,
the network node includes an MME (Mobility Management Entity), and the subscriber information management apparatus includes an HSS (Home Subscriber Server).

4. The terminal according to claim 1, wherein
the radio access device includes an RNC (Radio Network Controller), the network node includes an SGSN (Serving GPRS (General Packet Radio Service) Support Node), and
the subscriber information management apparatus includes an HLR (Home Location Register).

5. The terminal according to claim 3, wherein the base station comprises an eNodeB.

6. A communication method of a terminal for a mobile communication system, the communication method comprising:
transmitting an Attach Request to a network node, wherein
the network node transmits to a radio access device a request signal including an identifier corresponding to a dedicated network node that is dedicated to serve a specific terminal, wherein the request signal is based on subscriber information obtained from a subscriber information management apparatus, and
the radio access device re-selects the dedicated network node based on the identifier, thereby connecting, by the specific terminal, to the dedicated network node reselected.

7. The communication method according to claim 6, further comprising:
transmitting identity information including terminal information after transmitting the Attach Request, wherein
the identity information is used, by the network node, for transmitting to the radio access device the request signal, and
the identity information is used, by the radio access device, for re-selecting the dedicated network node.

8. The communication method according to claim 6, wherein
the radio access device includes a base station,
the network node includes an MME (Mobility Management Entity), and the subscriber information management apparatus includes an HSS (Home Subscriber Server).

9. The communication method according to claim 6, wherein
the radio access device includes an RNC (Radio Network Controller), the network node includes an SGSN (Serving GPRS (General Packet Radio Service) Support Node), and
the subscriber information management apparatus includes an HLR (Home Location Register).

10. The communication method according to claim 8, wherein the base station comprises an eNodeB.

11. A network node, comprising:
a receiver configured to receive an Attach Request from a terminal; and
a transmitter configured to transmit to a radio access device a request signal including an identifier corresponding to a dedicated network node that is dedicated to serve a specific terminal, wherein the request signal is based on subscriber information obtained from a subscriber information management apparatus, wherein
the radio access device is configured to re-select the dedicated network node based on the identifier, thereby connecting, by the specific terminal, to the dedicated network node re-selected.

12. The network node according to claim 11, wherein
the receiver is configured to receive identity information including terminal information after receiving the Attach Request,
the transmitter is configured to transmit the radio access device the request signal based on the subscriber information and the identity information, and
the identity information is used, by the radio access device, for re-selecting the dedicated network node.

13. The network node according to claim 11, wherein
the dedicated network node does not further reroute a message in the case where the radio access device re-selects the dedicated network node.

14. The network node according to claim 11, wherein
the terminal includes a UE (User Equipment),
the radio access device includes a base station, and
the subscriber information management apparatus includes an HSS (Home Subscriber Server).

15. The terminal according to claim 11, wherein
the terminal includes a MS (Mobile Station),
the radio access device includes an RNC (Radio Network Controller), and the subscriber information management apparatus includes an HLR (Home Location Register).

16. The network node according to claim 14, wherein the base station comprises an eNodeB.

17. A communication method of a network node, the communication method comprising:
receiving an Attach Request from a terminal; and
transmitting to a radio access device a request signal including an identifier corresponding to a dedicated network node that is dedicated to serve a specific terminal, wherein the request signal is based on subscriber information obtained from a subscriber information management apparatus, wherein
the radio access device re-selects the dedicated network node based on the identifier, thereby connecting, by the specific terminal, to the dedicated network node re-selected.

18. The communication method according to claim 17, further comprising:
receiving identity information including terminal information after receiving the Attach Request;
transmitting to the radio access device the request signal based on the subscriber information and the identity information, wherein
the identity information is used, by the radio access device, for re-selecting the dedicated network node.

19. The communication method according to claim 17, comprising
not further rerouting a message in the case where the radio access device re-selects the dedicated network node.

20. The communication method according to claim 17, wherein
the terminal includes a UE (User Equipment),
the radio access device includes a base station, and
the subscriber information management apparatus includes an HSS (Home Subscriber Server).

21. The communication method according to claim 17, wherein
the terminal includes a MS (Mobile Station),
the radio access device includes an RNC (Radio Network Controller), and
the subscriber information management apparatus includes an HLR (Home Location Register).

22. The communication method according to claim 20, wherein the base station comprises an eNodeB.

23. A mobile communication system, comprising:
a terminal;
a radio access device;
a network node;
a subscriber information management apparatus, wherein
the terminal is configured to transmit an Attach Request to the network node, the network node is configured to transmit to the radio access device a request signal including an identifier corresponding to a dedicated network node that is dedicated to serve a specific terminal, wherein the request signal is based on subscriber information obtained from the subscriber information management apparatus, and
the radio access device is configured to re-select the dedicated network node based on the identifier, thereby connecting, by the specific terminal, to the dedicated network node re-selected.

24. The mobile communication system according to claim 23, wherein
the radio access device includes a base station,
the network node includes an MME (Mobility Management Entity), and the subscriber information management apparatus includes an HSS (Home Subscriber Server).

25. The mobile communication system according to claim 23, wherein the radio access device includes an RNC (Radio Network Controller),
the network node includes an SGSN (Serving GPRS (General Packet Radio Service) Support Node), and
the subscriber information management apparatus includes an HLR (Home Location Register).

26. The mobile communication system according to claim 24, wherein the base station comprises an eNodeB.

27. A communication method in a mobile communication system, the method comprising:
transmitting, by a terminal, an Attach Request to a network node;
transmitting, by the network node, to a radio access device a request signal including an identifier corresponding to a dedicated network node that is dedicated to serve a specific terminal, wherein the request signal is based on subscriber information obtained from a subscriber information management apparatus;
re-selecting, by the radio access device, the dedicated network node based on the identifier and the identity information from the terminal; and
transmitting, by the radio access device, a Non-Access Stratum (NAS) message to the dedicated network node re-selected.

28. The communication method according to claim 27, wherein
the radio access device includes a base station,
the network node includes an MME (Mobility Management Entity), and
the subscriber information management apparatus includes an HSS (Home Subscriber Server).

29. The communication method according to claim 27, wherein the radio access device includes an RNC (Radio Network Controller),
the network node includes an SGSN (Serving GPRS (General Packet Radio Service) Support Node), and
the subscriber information management apparatus includes an HLR (Home Location Register).

30. The communication method according to claim 28, wherein the base station comprises an eNodeB.

* * * * *